United States Patent
Liang et al.

(10) Patent No.: US 12,132,217 B2
(45) Date of Patent: Oct. 29, 2024

(54) BATTERY MODULE, BATTERY PACK, APPARATUS, AND METHOD AND DEVICE FOR MANUFACTURING BATTERY MODULE

(71) Applicant: Contemporary Amperex Technology Co., Limited, Ningde (CN)

(72) Inventors: Chengdu Liang, Ningde (CN); Quanguo Li, Ningde (CN); Yonghuang Ye, Ningde (CN); Qian Liu, Ningde (CN); Haizu Jin, Ningde (CN); Wei Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/970,603

(22) Filed: Oct. 21, 2022

(65) Prior Publication Data
US 2023/0231249 A1    Jul. 20, 2023

Related U.S. Application Data

(63) Continuation of application No. PCT/CN2020/105474, filed on Jul. 29, 2020.

(51) Int. Cl.
*H01M 50/204*    (2021.01)
*H01M 4/02*    (2006.01)
(Continued)

(52) U.S. Cl.
CPC ......... *H01M 50/204* (2021.01); *H01M 4/525* (2013.01); *H01M 4/5825* (2013.01);
(Continued)

(58) Field of Classification Search
None
See application file for complete search history.

(56) References Cited

U.S. PATENT DOCUMENTS 8,993,140 B2    3/2015    Schiemann et al.
9,799,873 B2    10/2017    Kohlberger
(Continued)

FOREIGN PATENT DOCUMENTS

CN    107004920 A    8/2007
CN    101262049 A    9/2008
(Continued)

OTHER PUBLICATIONS

Yanbing, CN-101409369 Machine Translation (Year: 2009).*
(Continued)

*Primary Examiner* — Ula C Ruddock
*Assistant Examiner* — Anna Korovina
(74) *Attorney, Agent, or Firm* — East IP P.C.

(57) ABSTRACT

The present application discloses a battery module, a battery pack, an apparatus, and a method and device for manufacturing a battery module. The battery module includes n first-type battery cells and m second-type battery cells, $n \geq 1$, $m \geq 1$, and the n first-type battery cells and them second-type battery cells are arranged and satisfy: $VED_1 > VED_2$, $\Delta F_1 > \Delta F_2$, and $(\Delta F_1 \times n + \Delta F_2 \times m)/(n+m) \leq 0.8 \times \Delta F_1$, where $VED_1$, $VED_2$, $\Delta F_1$ and $\Delta F_2$ are respectively defined in the description.

16 Claims, 4 Drawing Sheets

(51) Int. Cl.
  *H01M 4/525* (2010.01)
  *H01M 4/58* (2010.01)
  *H01M 4/583* (2010.01)
  *H01M 10/04* (2006.01)

(52) U.S. Cl.
  CPC ....... *H01M 4/583* (2013.01); *H01M 10/0404* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 10,128,528 B2 | 11/2018 | Zhang et al. | |
| 10,587,001 B2 | 3/2020 | Park | |
| 2006/0197496 A1 | 9/2006 | Iijima et al. | |
| 2007/0072059 A1 | 3/2007 | Kitao et al. | |
| 2008/0241666 A1 | 10/2008 | Baba et al. | |
| 2009/0162751 A1 | 6/2009 | Honbo et al. | |
| 2010/0136391 A1 | 6/2010 | Prilutsky et al. | |
| 2011/0086248 A1 | 4/2011 | Nakura | |
| 2012/0126753 A1 | 5/2012 | Carkner | |
| 2012/0164490 A1 | 6/2012 | Itoi et al. | |
| 2012/0189885 A1 | 7/2012 | Kishii et al. | |
| 2013/0337310 A1 | 12/2013 | Omura et al. | |
| 2014/0020235 A1* | 1/2014 | Aramaki | H01M 4/139 29/730 |
| 2014/0087227 A1 | 3/2014 | Shih et al. | |
| 2014/0181551 A1 | 6/2014 | Rahal-Arabi et al. | |
| 2014/0186659 A1 | 7/2014 | Dhar et al. | |
| 2014/0342216 A1 | 11/2014 | Kohlberger | |
| 2015/0132625 A1 | 5/2015 | Miyata et al. | |
| 2015/0188188 A1 | 7/2015 | Zhang et al. | |
| 2015/0188207 A1 | 7/2015 | Son et al. | |
| 2015/0280276 A1 | 10/2015 | Lemke et al. | |
| 2015/0357687 A1 | 12/2015 | Heeg et al. | |
| 2015/0357688 A1 | 12/2015 | Heeg et al. | |
| 2016/0099451 A1 | 4/2016 | Murai et al. | |
| 2016/0126546 A1 | 5/2016 | Takami et al. | |
| 2016/0200214 A1 | 7/2016 | Ishibashi et al. | |
| 2016/0301045 A1 | 10/2016 | Tyler et al. | |
| 2016/0380315 A1 | 12/2016 | Weicker et al. | |
| 2017/0365886 A1 | 12/2017 | Hoshina et al. | |
| 2018/0034023 A1 | 2/2018 | Newman et al. | |
| 2018/0138478 A1 | 5/2018 | Chan | |
| 2018/0145383 A1 | 5/2018 | Krishnan et al. | |
| 2018/0159101 A1 | 6/2018 | Tsang et al. | |
| 2018/0351219 A1 | 12/2018 | NextEV | |
| 2019/0067658 A1 | 2/2019 | Fujiwara et al. | |
| 2019/0103625 A1 | 4/2019 | Haraguchi et al. | |
| 2019/0157636 A1 | 5/2019 | Miler et al. | |
| 2019/0225093 A1 | 7/2019 | Li et al. | |
| 2019/0226859 A1 | 7/2019 | Li et al. | |
| 2019/0267686 A1 | 8/2019 | Shimizu et al. | |
| 2019/0334143 A1 | 10/2019 | Sugeno | |
| 2020/0014000 A1 | 1/2020 | Roddy et al. | |
| 2020/0058968 A1 | 2/2020 | Thompson et al. | |
| 2020/0106126 A1 | 4/2020 | Yokoshima et al. | |
| 2020/0130511 A1* | 4/2020 | Botts | H01M 4/485 |
| 2020/0313255 A1 | 10/2020 | Wu et al. | |
| 2020/0381928 A1 | 12/2020 | Isaksson et al. | |
| 2021/0050635 A1 | 2/2021 | Lee et al. | |
| 2021/0074979 A1 | 3/2021 | Kwak et al. | |
| 2021/0091428 A1 | 3/2021 | Naito et al. | |
| 2021/0296721 A1 | 9/2021 | Omura et al. | |
| 2021/0328281 A1 | 10/2021 | Chu et al. | |
| 2021/0391628 A1 | 12/2021 | Hattendorff et al. | |
| 2022/0123427 A1 | 4/2022 | Ren et al. | |

FOREIGN PATENT DOCUMENTS

| | | | |
|---|---|---|---|
| CN | 101409369 A * | 4/2009 | |
| CN | 101 5049 77 A | 8/2009 | |
| CN | 101635372 A | 1/2010 | |
| CN | 101 6755 55 A | 3/2010 | |
| CN | 201 74 98 97 U | 2/2011 | |
| CN | 102027617 A | 4/2011 | |
| CN | 102447301 A | 5/2012 | |
| CN | 202 3082 27 U | 7/2012 | |
| CN | 101 2420 11 B | 9/2012 | |
| CN | 103 31 15 62 A | 9/2013 | |
| CN | 104126238 A | 10/2014 | |
| CN | 104979503 A | 10/2015 | |
| CN | 105006586 A | 10/2015 | |
| CN | 105186066 A | 12/2015 | |
| CN | 105 91 48 04 A | 8/2016 | |
| CN | 105849968 A | 8/2016 | |
| CN | 106207016 A | 12/2016 | |
| CN | 206 2255 03 U | 6/2017 | |
| CN | 1071126 03 A | 8/2017 | |
| CN | 206 56 77 73 U | 10/2017 | |
| CN | 107256971 A * | 10/2017 | |
| CN | 108 5985 98 A | 9/2018 | |
| CN | 208 5078 49 U | 2/2019 | |
| CN | 20867 43 05 U | 3/2019 | |
| CN | 109428114 A | 3/2019 | |
| CN | 109 65 94 65 A | 4/2019 | |
| CN | 110048151 A | 7/2019 | |
| CN | 110065414 A | 7/2019 | |
| CN | 110071236 A | 7/2019 | |
| CN | 209071461 U | 7/2019 | |
| CN | 209183604 U | 7/2019 | |
| CN | 1102655 91 A | 9/2019 | |
| CN | 110265627 A | 9/2019 | |
| CN | 110380144 A | 10/2019 | |
| CN | 110444835 A | 11/2019 | |
| CN | 110456275 A | 11/2019 | |
| CN | 110678393 A | 1/2020 | |
| CN | 110739424 A | 1/2020 | |
| CN | 2100403 32 U | 2/2020 | |
| CN | 2104038 75 U | 4/2020 | |
| CN | 111106277 A | 5/2020 | |
| CN | 111106278 A | 5/2020 | |
| CN | 111446488 A | 7/2020 | |
| CN | 111584792 A | 8/2020 | |
| CN | 211295236 U | 8/2020 | |
| CN | 1116684 09 A | 9/2020 | |
| CN | 111668408 A | 9/2020 | |
| CN | 211629259 U | 10/2020 | |
| CN | 111 900294 A | 11/2020 | |
| CN | 213584016 U | 6/2021 | |
| DE | 102012215495 A1 | 3/2014 | |
| DE | 202017104111 U1 | 10/2018 | |
| DE | 102017212223 A1 | 1/2019 | |
| EP | 1265302 A2 | 12/2002 | |
| EP | 3193402 A1 | 7/2017 | |
| EP | 3261161 A1 | 12/2017 | |
| EP | 3316391 A1 | 5/2018 | |
| EP | 3358706 A1 | 8/2018 | |
| EP | 3675218 A1 | 7/2020 | |
| EP | 3905377 A1 | 11/2021 | |
| EP | 3926724 A2 | 12/2021 | |
| JP | H07320775 A | 12/1995 | |
| JP | H11121041 * | 4/1999 | Y02E 60/10 |
| JP | 2003174734 A | 6/2003 | |
| JP | 2004342 580 A | 12/2004 | |
| JP | 2005071917 A | 3/2005 | |
| JP | 2007059145 A | 3/2007 | |
| JP | 2008226518 A | 9/2008 | |
| JP | 2009021223 A | 1/2009 | |
| JP | 2010250984 A | 11/2010 | |
| JP | 2011065906 A | 3/2011 | |
| JP | 201 21 13 899 A | 6/2012 | |
| JP | 2012234696 A | 11/2012 | |
| JP | 2013509688 A | 3/2013 | |
| JP | 2014072025 A | 4/2014 | |
| JP | 2014112463 A * | 6/2014 | H01M 10/0525 |
| JP | 201 5018 706 A | 1/2015 | |
| JP | 2015133169 A | 7/2015 | |
| JP | 2015170591 A | 9/2015 | |
| JP | 2015530858 A | 10/2015 | |
| JP | 2015204247 A | 11/2015 | |
| JP | 2015211025 A | 11/2015 | |

(56) References Cited

FOREIGN PATENT DOCUMENTS

| | | |
|---|---|---|
| JP | 2017139844 A | 8/2017 |
| JP | 2019129 149 A | 8/2019 |
| JP | 2019139 879 A | 8/2019 |
| JP | 2020035692 A | 3/2020 |
| JP | 2020527848 A | 9/2020 |
| JP | 2023509197 A | 3/2023 |
| JP | 2023509198 A | 3/2023 |
| KR | 20190082974 A | 7/2019 |
| WO | 2004095611 A1 | 11/2004 |
| WO | 2009113281 A1 | 9/2009 |
| WO | 2011114349 A2 | 9/2011 |
| WO | 2012014418 A1 | 2/2012 |
| WO | 2012060031 A1 | 5/2012 |
| WO | 2013011915 A1 | 1/2013 |
| WO | 2013031613 A1 | 3/2013 |
| WO | 2013069308 A1 | 5/2013 |
| WO | 2013099293 A1 | 7/2013 |
| WO | 2014045569 A1 | 3/2014 |
| WO | 2017191679 A1 | 11/2017 |
| WO | 2019123903 A1 | 6/2019 |
| WO | 2019161751 A1 | 8/2019 |
| WO | 2019187313 A1 | 10/2019 |
| WO | 2020133659 A1 | 7/2020 |
| WO | 2020133660 A1 | 7/2020 |
| WO | 2020134054 A1 | 7/2020 |
| WO | 2020135152 A1 | 7/2020 |

OTHER PUBLICATIONS

Fukata, JP-2014112463 Machine Translation (Year: 2014).*
Chen, CN-107256971 Machine Translation (Year: 2017).*
Kurokawa et al., JP-H11121041 Machine Translation (Year: 1999).*
The extended European search report for European Application No. 20947010.3, dated Jan. 25, 2023, 9 pages.
The International search report for PCT Application No. PCT/CN2020/105474, dated Apr. 26, 2021, 15 pages.
General Rules For Analytical scanning electron microscopy. JYT 010-1996, 12 pages.
Particle Size Analysis-Laser Diffraction Methods. GBT 19077-2016, 47 pages.
The International search report for PCT Application No. PCT/CN2020/119738, dated Jun. 25, 2021, 8 pages.
The extended European search report for European Application No. 20955830.3, dated Mar. 30, 2023, 8 pages.
The extended European search report for European Application No. 20947817.1, dated Nov. 30, 2022, 7 pages.
The International search report for PCT Application No. PCT/CN2020/139180, dated Sep. 29, 2021, 6 pages.
The International search report for PCT Application No. PCT/CN2020/119736, dated Apr. 28, 2021, 8 pages.
The International search report for PCT Application No. PCT/CN2020/129475, dated Aug. 16, 2021, 6 pages.
The search report for JP Application No. 2022-539699, dated Jul. 13, 2023, 25 pages.
The International search report for PCT Application No. PCT/CN2020/119737, dated Jul. 2, 2021, 5 pages.
The International search report for PCT Application No. PCT/CN2021/109686, dated Apr. 25, 2022, 6 pages.
The International search report for PCT Application No. PCT/CN2021/089665, dated Jul. 30, 2021, 17 pages.
The International search report for PCT Application No. PCT/CN2021/089319, dated Jul. 26, 2021, 14 pages.
The First Office Action for Chinese Application No. 202010786641.X, dated Oct. 26, 2022, 16 pages.
The First Office Action for Chinese Application No. 2020 107 86523.9, dated Oct. 24, 2022, 17 pages.
The extended European search report for EP Application No. 21789597.8, dated Nov. 16, 2022, 11 pages.
The partial supplementary extended European search report for EP Application No. 21 789597.8, dated Aug. 12, 2022, 13 pages.
The extended European search report for EP Application No. 21790065.3, dated Nov. 18, 2022, 11 pages.
The partial supplementary extended European search report for EP Application No. 21 790065.3, dated Aug. 18, 2022, 13 pages.
The First Office Action forIndian Application No. 202217009095, dated Dec. 16, 2022, 6 pages.
The Second Office Action for Chinese Application No. 202010786523.9, dated Feb. 28, 2023, 10 pages.
The First Office Action for Chinese Application No. 202080054687.0, dated Jul. 24, 2023, 8 pages.
The First Office Action for Japanese Application No. 2022-542009, dated Sep. 4, 2023, 6 pages.
The extended European Search Report for European Application No. 20961838.8, dated Aug. 17, 2023, 4 pages.
The Final Rejection for the U.S. Appl. No. 17/985,813, date Aug. 9, 2023, 24 pages.
The Notice of Allowance for the U.S. Appl. No. 17/985,813, date Dec. 12, 2023, 9 pages.
The extended European Search Report for European Application No. 20955828.7, dated Sep. 27, 2023, 6 pages.
The First Office Action for Japanese Application No. 2022542013, dated Oct. 2, 2023, 9 pages.
The extended European Search Report for European Application No. 21937198.6, dated Aug. 14, 2023, 6 pages.
The First Office Action for Chinese Application No. 202080054659.9, dated Jun. 24, 2023, 12 pages.
The Non-Final Rejection for the U.S. Appl. No. 17/892,621, date Feb. 3, 2023, 6 pages.
The Non-Final Rejection for the U.S. Appl. No. 18/054,375, date Aug. 24, 2023, 12 pages.
The Requirement for Restriction for the U.S. Appl. No. 18/054,375, date Jul. 7, 2023, 8 pages.
The Non-Final Rejection for the U.S. Appl. No. 17/985,851, date Mar. 22, 2023, 9 pages.
The First Office Action for Japanese Application No. 2022-539699, dated Jul. 31, 2023, 8 pages.
The Non-Final Rejection for the U.S. Appl. No. 17/985,813, date Mar. 8, 2023, 17 pages.
The Non-Final Rejection for the U.S. Appl. No. 17/985,813, date Jun. 14, 2023, 19 pages.
The Non-Final Rejection for the U.S. Appl. No. 18/053,493, date Mar. 9, 2023, 28 pages.
The Non-Final Rejection for the U.S. Appl. No. 18/149,672, date May 30, 2023, 7 pages.
The First Office Action for CN Application No. 202080104131.8, dated Jun. 4, 2024, 12 pages.
The First Office Action for CN Application No. 202080102030.7, dated Jun. 18, 2024, 6 pages.
The Notice of Allowance for KR Application No. 10-2022-7021878, dated May 10, 2024, 6 pages.
The Second Office Action for Japanese Application No. 2022-542009, dated Feb. 5, 2024, 9 pages.
The extended European search report for EP Application No. 20955829.5, dated Mar. 25, 2024, 8 pages.
The Notice of Allowability for U.S. Appl. No. 17/985,813, dated Feb. 22, 2024, 12pages.
The Notice of Allowability for Japanese Application No. 2022542013, dated Mar. 18, 2024, 6 pages.
The Non-final Office Action for U.S. Appl. No. 18/053,493, dated Jan. 29, 2024, 39 pages.
The First Office Action for KR Application No. 10-2022-7021104, dated Jul. 31, 2024, 15 pages.
The Notice of Allowance for JP Application No. 2022-542009, dated Aug. 5, 2024, 6 pages.
The First Office Action for KR Application No. 10-2022-7022467, dated Aug. 28, 2024, 13 pages.

* cited by examiner

BATTERY MODULE, BATTERY PACK, APPARATUS, AND METHOD AND DEVICE FOR MANUFACTURING BATTERY MODULE

CROSS-REFERENCE TO RELATED APPLICATION

This application is a continuation of International Application No. PCT/CN2020/105474, filed on Jul. 29, 2020 and entitled "BATTERY MODULE, BATTERY PACK, APPARATUS, AND METHOD AND DEVICE FOR MANUFACTURING BATTERY MODULE", which is incorporated herein by reference in its entirety.

TECHNICAL FIELD

This application belongs to the technical field of energy storage apparatuses, and specifically relates to a battery module, a battery pack, an apparatus, and a method and device for manufacturing a battery module.

BACKGROUND

Secondary batteries have been widely used because of their characteristics of high energy density, long service life, no memory effect, environmental friendliness during use, etc.

In addition, according to application scenarios and energy density requirements, a plurality of battery cells are usually assembled into a battery module, a battery pack, or an electrical cabinet system as an important energy component of a new energy vehicle or an energy storage power station. For example, with the accelerated popularity of new energy vehicles, the demand for driving mileage continues to increase. Accordingly, the battery modules or battery packs carried by the new energy vehicles continue to require higher energy density. As a result, most of the battery modules or battery packs use battery cells with high energy density, and the number of battery cells contained in a limited space is also increasing.

However, the battery modules or battery packs with high energy density are prone to fast capacity fading, significant reduction in driving mileage after a single full charge, etc. during long-term use, especially in the middle and late stages of their service life. How to achieve long service life of the batteries with high energy density and single long endurance in the entire life cycle has become a technical difficulty that needs to be solved urgently in the practical application of secondary batteries.

SUMMARY

A first aspect of the present application provides a battery module, including a battery unit, wherein the battery unit includes n first-type battery cells and m second-type battery cells, n≥1, m≥1, and the n first-type battery cells and the m second-type battery cells are arranged and satisfy:

$VED_1 > VED_2$, $\Delta F_1 > \Delta F_2$, $(\Delta F_1 \times n + \Delta F_2 \times m)/(n+m) \leq 0.8 \times \Delta F_1$, where $VED_1$ represents a volumetric energy density of the first-type battery cell, in Wh/L,
$VED_2$ represents a volumetric energy density of the second-type battery cell, in Wh/L,
$\Delta F_1$ represents an expansion force change rate of the first-type battery cell, in Newton/cycle, and
$\Delta F_2$ represents an expansion force change rate of the second-type battery cell, in Newton/cycle.

The present application combines the first-type battery cells with higher volumetric energy density and higher expansion force change rate with the second-type battery cells with lower volumetric energy density and lower expansion force change rate, and controls the expansion force change rate of the first-type battery cells and the expansion force change rate of the second-type battery cells to satisfy a specific relationship, thereby effectively reducing the average expansion force change rate of the battery cells in the battery module during cyclic charge and discharge, and improving the stability of ion transport interfaces between electrode plates and between the electrode plates and a separator in each battery cell of the battery module during cyclic charge and discharge, which can prolong the long-term cycle life of the entire battery module and still obtain high capacity after a single full charge in the middle and late stages of the service life.

In any of the above embodiments, optionally, $(\Delta F_1 \times n + \Delta F_2 \times m)/(n+m) \leq 0.75 \times \Delta F_1$. By further reducing the average expansion force change rate of the battery cells in the battery module, the long-term cycle life of the entire battery module can be further prolonged.

Optionally, $0.5 \times \Delta F_1 \leq (\Delta F_1 \times n + \Delta F_2 \times m)/(n+m) \leq 0.65 \times \Delta F_1$. This is beneficial for the battery module to better balance a higher volumetric energy density and a longer cycle life at the same time.

In any of the above embodiments, the $\Delta F_1$ may be 6 Newton/cycle to 15 Newton/cycle, 7 Newton/cycle to 14 Newton/cycle, 7 Newton/cycle to 13 Newton/cycle, 7.3 Newton/cycle to 12.6 Newton/cycle, or 8.2 Newton/cycle to 12.6 Newton/cycle. The $\Delta F_2$ may be 0.9 Newton/cycle to 4.5 Newton/cycle, 1.4 Newton/cycle to 4 Newton/cycle, 1.2 Newton/cycle to 3.5 Newton/cycle, 1.2 Newton/cycle to 2.3 Newton/cycle, or 1.4 Newton/cycle to 1.6 Newton/cycle. In the present application, when the expansion force change rate of the first-type battery cells and/or the expansion force change rate of the second-type battery cells are within appropriate ranges, the cyclic expansion force in the battery module can be further reduced, thereby further prolonging the cycle life of the battery module, and increasing the volumetric energy density of the battery module. In addition, the safety performance of the battery module can also be improved.

In any of the above embodiments, the expansion force change rate is an average expansion force change $\Delta F/500$ after 500 cycles of charging and discharging of a battery cell at 25° C. and a 0.33 $C_0$ rate ($C_0$ represents a nominal capacity of the battery cell) within an upper cut-off voltage and lower cut-off voltage range of the battery cell, and the $\Delta F$ is a change value of pressure of the battery cell detected by a sensor of a detection device at the 500th cycle relative to the pressure of the battery cell detected at the beginning.

In any of the above embodiments, a nominal capacity C1 of the first-type battery cell and a nominal capacity C2 of the second-type battery cell satisfy: $0.9 \leq C1/C2 \leq 1.1$. In the present application, when the nominal capacity C1 of the first-type battery cell and the nominal capacity C2 of the second-type battery cell are within the above range, a relatively high energy output of the battery module or battery pack can be ensured. Meanwhile, because the volumetric energy density of the first-type battery cell is higher than that of the second-type battery cell, it is better to keep the volume difference between the first-type battery cell and the second-type battery cell within a certain range, which achieves a more significant effect in improving the overall expansion force of the battery module or battery pack.

In any of the above embodiments, the number of first-type battery cells continuously arranged in the battery unit is not more than n/2. Further, the number may be not more than n/3. Optionally, the number of first-type battery cells continuously arranged in the battery unit is not more than 5, or not more than 3. As an example, the number of first-type battery cells continuously arranged in the battery unit may be 1 to 3, 2 to 3, or 1 to 2, etc. The second-type battery cells are arranged every appropriate number of first-type battery cells in the battery unit, which can further improve the cyclic expansion force of the battery module, thereby further prolonging the cycle life of the battery module.

In any of the above embodiments, the number n of the first-type battery cells and the number m of the second-type battery cells can satisfy: $5 \leq n+m \leq 30$. Optionally, $8 \leq n+m \leq 25$. Further optionally, $9 \leq n+m \leq 20$.

In any of the above embodiments, the battery module can satisfy $(VED_1 \times n + VED_2 \times m)/(n+m) \geq 0.7 \times VED_1$. Optionally, $(VED_1 \times n + VED_2 \times m)/(n+m) \geq 0.78 \times VED_1$. In the present application, $(VED_1 \times n + VED_2 \times m)/(n+m)$ represents an average volumetric energy density of the battery cells in the battery module. When $(VED_1 \times n + VED_2 \times m)/(n+m)$ satisfies the above relationship, the assembled battery module can also have a relatively high volumetric energy density while its cyclic expansion force is relatively low and its long-term cycle life is effectively prolonged.

In any of the above embodiments, the battery module can satisfy $VED_2 \times m/(VED_1 \times n + VED_2 \times m) \times 100\% \leq 65\%$. Optionally, $VED_2 \times m/(VED_1 \times n + VED_2 \times m) \times 100\% \leq 60\%$, $\leq 55\%$, $\leq 50\%$, $\leq 45\%$, or $\leq 40\%$. Further, the battery module can satisfy $VED_2 \times m/(VED_1 \times n + VED_2 \times m) \times 100\% \geq 10\%$. Optionally, $VED_2 \times m/(VED_1 \times n + VED_2 \times m) \times 100\% \geq 15\%$, $\geq 20\%$, $\geq 25\%$, $\geq 30\%$, or $\geq 35\%$. Further optionally, $20\% \leq VED_2 \times m/(VED_1 \times n + VED_2 \times m) \times 100\% \geq 40\%$. In the battery module of the present application, when the volumetric energy density of the first-type battery cells and the volumetric energy density of the second-type battery cells further satisfy the above relationship, the battery module can simultaneously have a relatively long cycle life and a relatively high volumetric energy density.

In any of the above embodiments, the volumetric energy density VED of the battery module is $\leq 300$ Wh/L. Optionally, VED$\leq 350$ Wh/L. The battery module not only has a relatively long cycle life, but also has a relatively high volumetric energy density.

In any of the above embodiments, the first-type battery cell includes a first negative electrode plate, and the first negative electrode plate includes a first negative electrode film containing a first negative electrode active material, wherein the first negative electrode active material includes one or more of artificial graphite and natural graphite, the first negative electrode film has an areal density $CW_1$ of 9.70 mg/cm$^2$ to 11.68 mg/cm$^2$, and the first negative electrode film has a compaction density $PD_1$ of 1.35 g/cm$^3$ to 1.65 g/cm$^3$.

The first-type battery cell adopting the first negative electrode plate has not only a relatively high energy density but also a relatively low cyclic expansion force, so that the battery module adopting the first-type battery cell has a relatively low cyclic expansion force. In the middle and late stages of the service life of the battery module, the volume of the negative electrode plate is expanded little, which effectively improves the structural stability of the negative electrode active material under the action of external force.

As a result, the battery module has a relatively long cycle life under the premise of high energy density, and can still exert a large capacity after single charge and discharge in the middle and late stages of the service life of the battery module.

Optionally, the $CW_1$ may be 10.38 mg/cm$^2$ to 11.36 mg/cm$^2$.

Optionally, the $PD_1$ may be 1.40 g/cm$^3$ to 1.60 g/cm$^3$, or 1.45 g/cm$^3$ to 1.55 g/cm$^3$.

In any of the above embodiments, the first-type battery cell includes a first positive electrode plate, the first positive electrode plate includes a first positive electrode active material, and the first positive electrode active material includes a lithium transition metal oxide represented by formula (I),

$$Li_{1+x1}Ni_aCo_bM_{1-a-b}O_{2-y1}A_{y1} \qquad \text{formula (I)}$$

where $-0.1 \leq x1 \leq 0.2$, $0.5 \leq a \leq 0.95$, $0<b<0.2$, $0<a+b<1$, $0<y1<0.2$, M is one or more selected from Mn, Fe, Cr, Ti, Zn, V, Al, Zr and Ce, and A is one or more selected from S, F, Cl and I.

The first-type battery cell can achieve a relatively high energy density, so that the battery module can achieve a relatively high energy density.

Optionally, the first positive electrode active material includes single particles having a volumetric average particle diameter $D_v50$ of 2 μm to 8 μm. The first positive electrode active material includes the single particles, which can further prolong the cycle life of the battery module.

Optionally, in the first positive electrode active material, the first positive electrode active material in a single particle form has a quantity percentage of $\geq 40\%$. When the first positive electrode active material includes more single particles, the cycle life of the battery module can be further prolonged.

In any of the above embodiments, the second-type battery cell includes a second negative electrode plate, and the second negative electrode plate includes a second negative electrode film containing a second negative electrode active material, wherein the second negative electrode active material includes one or more of artificial graphite and natural graphite, the second negative electrode film has an areal density $CW_2$ of 6.50 mg/cm$^2$ to 9.70 mg/cm$^2$, and the second negative electrode film has a compaction density $PD_2$ of 1.35 g/cm$^3$ to 1.65 g/cm$^3$.

The second-type battery cell adopting the second negative electrode plate can provide a relatively low cyclic expansion force, so that the battery module adopting the second-type battery cell has a relatively low cyclic expansion force. In the middle and late stages of the service life of the battery module, the volume of the negative electrode plate is expanded little, which effectively improves the structural stability of the negative electrode active material under the action of external force. Therefore, the overall cycle life of the battery module can be prolonged, and a large capacity can still be exerted after single charge and discharge in the middle and late stages of the service life of the battery module. In addition, the second-type battery cell can also have a relatively high energy density, so that the energy density of the battery module is also relatively high.

Optionally, the $CW_2$ may be 8.11 mg/cm$^2$ to 9.40 mg/cm$^2$.

Optionally, the $PD_2$ may be 1.45 g/cm$^3$ to 1.60 g/cm$^3$, or 1.45 g/cm$^3$ to 1.55 g/cm$^3$.

In any of the above embodiments, the second-type battery cell includes a second positive electrode plate, the second positive electrode plate includes a second positive electrode active material, and the second positive electrode active material includes a lithium-containing phosphate represented by formula (II),

$$LiFe_{1-x2-y2}Mn_{x2}M'_{y2}PO_4 \quad \text{formula (II)}$$

where $0 \le x2 \le 1$, $0 \le y2 \le 0.1$, and M' is one or more selected from transition metal elements and non-transition metal elements other than Fe and Mn.

Optionally, the second positive electrode active material includes one or more of $LiFePO_4$, $LiMnPO_4$, $LiMn_{1-x3}Fe_{x3}PO_4$, and $LiV_{1-x3}Fe_{x3}PO_4$, where x3 independently satisfies $0 < x3 < 1$.

The second active material included in the second-type battery cell has better cycle stability, which is beneficial for the battery module to obtain a relatively long cycle life.

Optionally, the second positive electrode active material includes single particles having a volumetric average particle diameter $D_v50$ of 800 nm to 1.5 μm. The second positive electrode active material includes the single particles, which can prolong the cycle life of the battery module.

In any of the above embodiments, the electrical connection of the first-type battery cells and the second-type battery cells includes at least a series connection. Optionally, the electrical connection is a series connection or a combination of series/parallel connections. In the present application, after the first-type battery cells and the second-type battery cells are electrically connected at least in series, the first-type battery cells and the second-type battery cells will be synchronously charged/discharged. The volumetric expansion changes of different types of battery cells are coordinated, which is conducive to predicting the overall volumetric expansion rate of the battery module in advance in the design stage, and is more convenient to modulate the improvement range of the cycle life of the battery module.

A second aspect of the present application provides a battery pack, including the battery module according to the first aspect of the present application. The battery pack of the present application includes the battery module, and therefore has at least the same advantages as the battery module.

In any of the above embodiments, the battery pack includes two or more than two battery modules. Optionally, each battery module is the battery module according to the first aspect of the present application. As a result, the cyclic expansion force in the battery pack can be further reduced, and the cycle life of the battery pack can be prolonged.

A third aspect of the present application provides an apparatus, including the battery module according to the first aspect of the present application or the battery pack according to the second aspect of the present application, wherein the battery module or the battery pack is used to provide power for the apparatus or used as an energy storage unit of the apparatus. The apparatus of the present application includes the battery module or battery pack, and therefore has at least the same advantages as the battery module or battery pack.

A fourth aspect of the present application provides a method for manufacturing a battery module, including the following steps:

obtaining n first-type battery cells and m second-type battery cells, wherein $$VED_1 > VED_2, \Delta F_1 > \Delta F_2, n \ge 1, m \ge 1,$$

$$(\Delta F_1 \times n + \Delta F_2 \times m)/(n+m) \le 0.8 \times \Delta F_1,$$

where $VED_1$ represents a volumetric energy density of the first-type battery cell, in Wh/L, $VED_2$ represents a volumetric energy density of the second-type battery cell, in Wh/L, $\Delta F_1$ represents an expansion force change rate of the first-type battery cell, in Newton/cycle, and $\Delta F_2$ represents an expansion force change rate of the second-type battery cell, in Newton/cycle; and arranging the n first-type battery cells and the m second-type battery cells to form the battery module.

The battery module manufactured by the method of the present application can have a relatively low cyclic expansion force, and therefore can have a relatively long cycle life.

A fifth aspect of the present application provides a device for manufacturing a battery module, including:

a clamping arm unit, configured to obtain n first-type battery cells and m second-type battery cells, wherein $$VED_1 > VED_2, \Delta F_1 > \Delta F_2, n \ge 1, m \ge 1,$$

$$(\Delta F_1 \times n + \Delta F_2 \times m)/(n+m) \le 0.8 \times \Delta F_1,$$

where $VED_1$ represents a volumetric energy density of the first-type battery cell, in Wh/L, $VED_2$ represents a volumetric energy density of the second-type battery cell, in Wh/L, $\Delta F_1$ represents an expansion force change rate of the first-type battery cell, in Newton/cycle, and $\Delta F_2$ represents an expansion force change rate of the second-type battery cell, in Newton/cycle;

an assembling unit, configured to arrange the n first-type battery cells and the m second-type battery cells; and a control unit, configured to control the clamping arm unit and the assembling unit.

The battery module manufactured by the device of the present application can have a relatively low cyclic expansion force, and therefore can have a relatively long cycle life.

DESCRIPTION OF THE DRAWINGS

In order to explain the technical solutions of the embodiments of the present application more clearly, the following drawings that need to be used in the embodiments of the present application will be briefly explained. A person of ordinary skill in the art can obtain other drawings based on the drawings without inventive efforts.

DETAILED DESCRIPTION

Figure 1:
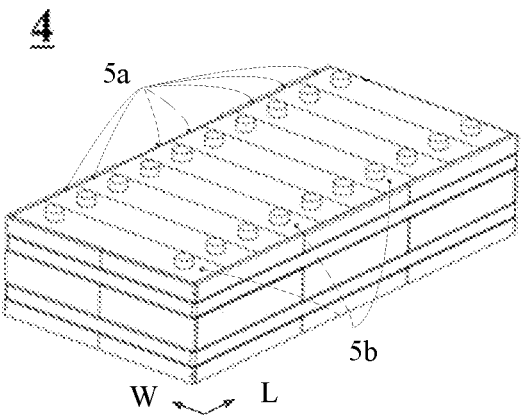
FIG. 1 is a schematic diagram of an embodiment of a battery module.

In order to make the objectives, technical solutions and beneficial technical effects of the present application clearer, the present application will be further described in details below in conjunction with embodiments. It should be understood that the embodiments described in this specification are only for explaining the application, not intended to limit the application.

For the sake of brevity, only certain numerical ranges are explicitly disclosed herein. However, any lower limit may be combined with any upper limit to form a range that is not explicitly described; and any lower limit may be combined with any other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described herein includes the lower or upper limit itself, and "several" in "one or several" means two or more.

The above summary of the present application is not intended to describe each disclosed embodiment or every implementation manner of the present application. The following description illustrates exemplary embodiments more specifically. In many places throughout the application, guidance is provided through a series of examples, which can be used in various combinations. In each instance, the enumeration is only a representative group and should not be interpreted as exhaustive.

In order to meet the requirement for high energy density, a positive electrode plate made of a positive electrode active material with high gram volume, such as a lithium nickel cobalt manganese oxide or a lithium nickel cobalt aluminum oxide, can be combined with a graphite negative electrode plate having relatively high areal density and compaction density to prepare a battery cell with high energy density. Then a plurality of battery cells are electrically connected to form a battery module, battery pack or energy storage system with high energy density. However, the battery cells with high energy density often undergo capacity fading during charge and discharge cycles, the accelerated capacity fading of the battery cells shortens the long-term cycle life of the battery module or battery pack, and then the driving mileage that can be achieved after a single charge and discharge is reduced in the middle and late stages of the service life of the battery module or battery pack.

At the present stage, in order to solve the above problems, most of the improvement schemes focus on the optimization of chemical systems in the battery cells, including use of electrolyte additives with high film-forming quality and stable electrochemical properties, further coating modification on positive electrode active materials, further improvement on surface activity and pressure resistance of negative electrode active materials, etc. However, the extension in the cycle life of battery cells can only improve the overall cycle performance of the battery module or battery pack to a certain extent.

After further research, the inventors found that when a plurality of battery cells are arranged to form a battery module or battery pack, the space utilization and electrical performance matching of the battery cells arranged also have a great impact on the overall performance of the battery module or battery pack. During the charging and discharging cycles of battery cells, with the gradual rebound of negative electrode plates and the decomposition of electrolytes to produce gas, the internal pressure and expansion force are increasing. When the battery module or battery pack with high energy density is designed, the residual volume not occupied by battery cells is often compressed, resulting in a small distance between battery cells. Therefore, during the charging and discharging cycles, especially in the middle and late stages of the cycle life, when the battery cells expand simultaneously, a large expansion force will accumulate in the battery module or battery pack, and the external extrusion force received by the battery cells will increase sharply. Under the high external extrusion force, the charging and discharging interface in the battery cells is prone to relative displacement, local electrolyte is squeezed out, the ion transport path is blocked, and thus the overall cycle performance of the battery module or battery pack may "dive" (that is, the capacity of the battery module decreases sharply during the charging and discharging process, or even the battery module cannot be continuously charged or discharged). Therefore, how to improve the overall cycle performance under the premise that the battery module or battery pack has a relatively high energy density is a key challenge in the art.

After intensive research, the inventors proposed that first-type battery cells with higher volumetric energy density and higher expansion force change rate can be reasonably combined with second-type battery cells with lower volumetric energy density and lower expansion force change rate, to effectively reduce the cyclic expansion force in the battery module or battery pack, and achieve the purpose of prolonging the cycle life of the battery module or battery pack under the premise of a relatively high volumetric energy density.

Therefore, an embodiment of the first aspect of the present application provides a battery module having a relatively high volumetric energy density and a relatively long cycle life.

Battery Module

The battery module of the present application includes a battery unit, wherein the battery unit includes n first-type battery cells and m second-type battery cells, $n \geq 1$, $m \geq 1$, and the n first-type battery cells and the m second-type battery cells are arranged and satisfy:

$$VED_1 > VED_2,$$

$$\Delta F_1 > \Delta F_2,$$

$$(\Delta F_1 \times n + \Delta F_2 \times m)/(n+m) \leq 0.8 \times \Delta F_1,$$

where $VED_1$ represents a volumetric energy density of the first-type battery cell, in Wh/L, $VED_2$ represents a volumetric energy density of the second-type battery cell, in Wh/L, $\Delta F_1$ represents an expansion force change rate of the first-type battery cell, in Newton/cycle, and $\Delta F_2$ represents an expansion force change rate of the second-type battery cell, in Newton/cycle.

In the battery module of the present application, a battery core and an electrolyte can be packaged in an outer package to form the first-type battery cell. The battery core can be formed by stacking or winding a first positive electrode plate, a separator and a first negative electrode plate, wherein the separator is located between the first positive electrode plate and the first negative electrode plate to separate the two. Generally, a first positive electrode active material is coated on a coated area of the first positive electrode plate, and a plurality of uncoated areas extending from the coated area of the first positive electrode plate can be stacked to form a positive electrode tab; a first negative electrode active material is coated on a coated area of the first negative electrode plate, and a plurality of uncoated areas extending from the coated area of the first negative electrode plate can be stacked to form a negative electrode tab. Further, the two tabs can be respectively electrically connected to corresponding electrode terminals (which can be arranged on a cover plate of the battery package) through adapters, so as to lead the electric energy out of the battery core. The first-type battery cell may be hexahedral (for example, cuboid, cuboid like, etc.) or in other shapes. Similarly, the second-type battery cell can be formed by a second positive electrode plate, a separator and a second negative electrode plate. The second-type battery cell may be hexahedral (for example, cuboid, cuboid like, etc.) or in other shapes.

In the present application, "the n first-type battery cells and the m second-type battery cells are arranged" means that the n first-type battery cells and the m second-type battery cells can be arranged in the length direction of the battery module, and two adjacent battery cells face each other in large surfaces. The large surface refers to a side surface with the largest area (calculated as an outer surface) in the battery cell. Generally, the large-surface expansion range of a battery cell is relatively high, and when two adjacent battery cells face each other in large surfaces, the cyclic expansion force of the battery module can be effectively reduced and the cycle life of the battery module can be prolonged.

The number n of the first-type battery cells and the number m of the second-type battery cells can be adjusted according to the application and capacity of the battery module. One or more battery cells may be included in the battery module, and the number can be adjusted according to requirements.

Through intensive research, the inventors found that the average extrusion force received by the battery cells in the battery module can be effectively improved by combining the first-type battery cells with higher volumetric energy density and higher expansion force change rate and the second-type battery cells with lower volumetric energy density and lower expansion force change rate, and controlling the expansion force change rate of the first-type battery cells and the expansion force change rate of the second-type battery cells to satisfy a specific relationship (i.e. $(\Delta F_1 \times n + \Delta F_2 \times m)/(n+m) \leq 0.8 \times \Delta F_1$), thereby greatly prolonging the long-term cycle life of the battery module. It is guessed that the reason may be as follows: because the interval between battery cells is usually small in a battery module, even if a buffer pad is disposed between the battery cells, once the buffer pad is compressed to the limit, a battery cell will still be extruded and restrained by adjacent battery cells. As the extrusion force received inside the battery cell is increasing, the electrolyte between the positive and negative electrodes is eventually extruded out, and the pore structure of the separator is blocked, causing difficulty in the transport of active ions during charging and discharging, an increase in concentration polarization of the interface, and degradation of the cycle performance of the battery cell. In the present application, the second-type battery cells are introduced and reasonably combined with the first-type battery cells, to achieve a continuous and effective buffering effect between the first-type battery cells, reduce the expansion rate of the first-type battery cells and release the internal stress of the first-type battery cells, thereby effectively reducing the overall cyclic expansion force of the battery cells also ensuring full infiltration of the electrolytes inside the first-type battery cells and the second-type battery cells, improving the stability of ion transport interfaces between electrode plates and between the electrode plates and the separator in each battery cell of the battery module, and prolonging the cycle life of the battery module accordingly.

In addition, because the cyclic expansion force of the first-type battery cells in the battery module is effectively relieved, the probability that excessive internal pressure breaks through an explosion-proof valve can be greatly reduced, the problem of short circuit or liquid leakage in the battery due to extrusion on the battery cell can also be avoided, and thus the battery module has relatively better safety performance.

In some embodiments, $(\Delta F_1 \times n + \Delta F_2 \times m)/(n+m)$ may be $\leq 0.75 \times \Delta F_1$, $\leq 0.7 \times \Delta F_1$, $\leq 0.65 \times \Delta F_1$, $\leq 0.6 \times \Delta F_1$, $\leq 0.55 \times \Delta F_1$, or $\leq 0.5 \times \Delta F_1$. This can further improve the cyclic expansion force in the battery module, and further prolong the cycle life of the battery module. In addition, $(\Delta F_1 \times n + \Delta F_2 \times m)/(n+m)$ may be $\geq 0.3 \times \Delta F_1$, $\geq 0.4 \times \Delta F_1$, $\geq 0.45 \times \Delta F_1$, $\geq 0.5 \times \Delta F_1$, or $\geq 0.55 \times \Delta F_1$. This not only can prolong the cycle life of the battery module, but also increases the number of first-type battery cells with a relatively high volumetric energy density in the battery module, so that the battery module has a higher volumetric energy density. Optionally, $0.5 \times \Delta F_1 \leq (\Delta F_1 \times n + \Delta F_2 \times m)/(n+m) \leq 0.7 \times \Delta F_1$, $0.5 \times \Delta F_1 \leq (\Delta F_1 \times n + \Delta F_2 \times m)/(n+m) \leq 0.65 \times \Delta F_1$, or $0.55 \times \Delta F_1 \leq (\Delta F_1 \times n + \Delta F_2 \times m)/(n+m) \leq 0.62 \times \Delta F_1$.

In the battery module of the present application, the n first-type battery cells and the m second-type battery cells in each battery unit can be arranged arbitrarily. For example, the m second-type battery cells are separately arranged between and/or at two ends of the n first-type battery cells. In some embodiments, the number of first-type battery cells continuously arranged in the battery unit is not more than n/2. Further, the number may be not more than n/3. As an example, the number of first-type battery cells continuously arranged in the battery unit is not more than 5, or not more than 3. For example, the number of first-type battery cells continuously arranged in the battery unit may be 1 to 10, 1 to 8, 1 to 5, 1 to 3, 2 to 3, or 1 to 2. The second-type battery cells are arranged every appropriate number of the first-type battery cells, which can further reduce the cyclic expansion force of the battery module, thereby further prolonging the cycle life of the battery module.

In some embodiments, the number n of the first-type battery cells and the number m of the second-type battery cells satisfy: $5 \leq n+m \leq 30$. Optionally, $8 \leq n+m \leq 25$. Further optionally, $9 \leq n+m \leq 20$. As an example, the sum of the number n of the first-type battery cells and the number m of the second-type battery cells may be 5, 6, 7, 8, 9, 10, 11, 12, 13, 14, 15, 16, 17, 18, 19, 20, 21, 22, 23, 24, 25, 26, 27, 28, 29, or 30.

In some embodiments, the expansion force change rate $\Delta F_1$ of the first-type battery cell may be 6 Newton/cycle to 15 Newton/cycle, 7 Newton/cycle to 14 Newton/cycle, 7 Newton/cycle to 13 Newton/cycle, 7.3 Newton/cycle to 12.6 Newton/cycle, or 8.2 Newton/cycle to 12.6 Newton/cycle. The expansion force change rate of the first-type battery cell within the appropriate range can ensure its relatively high energy density and keep the cyclic expansion force in the battery module relatively low, thereby further prolonging the cycle life of the battery module. In addition, the safety performance of the battery module can also be improved.

In some embodiments, the expansion force change rate $\Delta F_2$ of the second-type battery cell may be 0.9 Newton/cycle to 4.5 Newton/cycle, 1.4 Newton/cycle to 4 Newton/cycle, 1.6 Newton/cycle to 3.3 Newton/cycle, 1.2 Newton/cycle to 3.5 Newton/cycle, 1.2 Newton/cycle to 2.3 Newton/cycle, or 1.4 Newton/cycle to 1.6 Newton/cycle. The second-type battery cell has a relatively low expansion force change rate, which can reduce the cyclic expansion force of the entire battery module more effectively. Particularly, the use of a small number of second-type battery cells is enough to effectively reduce the cyclic expansion force in the entire battery module, which can further show the advantage of high volumetric energy density of the first-type battery cells, so that the volumetric energy density of the battery module is further improved.

In some embodiments, the battery module can satisfy $(VED_1 \times n + VED_2 \times m)/(n+m) \geq 0.7 \times VED_1$. Optionally, $(VED_1 \times n + VED_2 \times m)/(n+m) \geq 0.75 \times VED_1$, $(VED_1 \times n + VED_2 \times m)/(n+m) \geq 0.78 \times VED_1$, $(VED_1 \times n + VED_2 \times m)/(n+m) \geq 0.8 \times VED_1$, or $(VED_1 \times n + VED_2 \times m)/(n+m) \geq 0.83 \times VED_1$. In the battery module of the present application, $(VED_1 \times n + VED_2 \times m)/(n+m)$ represents an average volumetric energy density of the battery cells in the battery module. When $(VED_1 \times n + VED_2 \times m)/(n+m)$ satisfies the above relationship, the assembled battery module can also have a relatively high volumetric energy density while its cyclic expansion force is relatively low and its long-term cycle life is effectively prolonged.

In some embodiments, the battery module can satisfy $VED_2 \times m/(VED_1 \times n + VED_2 \times m) \times 100\% \leq 65\%$. Optionally, $VED_2 \times m/(VED_1 \times n + VED_2 \times m) \times 100\% \leq 60\%$, $\leq 55\%$, $\leq 50\%$, $\leq 45\%$, or $\leq 40\%$. Optionally, $VED_2 \times m/(VED_1 \times n + VED_2 \times m) \times 100\% \geq 10\%$, $\geq 15\%$, $\geq 20\%$, $\geq 25\%$, $\geq 30\%$, or $\geq 35\%$. Optionally, $20\% \leq VED_2 \times m/(VED_1 \times n + VED_2 \times m) \times 100\% \leq 40\%$. Optionally, $30\% \leq VED_2 \times m/(VED_1 \times n + VED_2 \times m) \times 100\% \leq 40\%$. In the battery module of the present application, when the expansion force change rate of the first-type battery cells and the expansion force change rate of the second-type battery cells, as well as the volumetric energy density of the first-type battery cells and the volumetric energy density of the second-type battery cells all satisfy the specific relationships, the battery module can simultaneously have a relatively long cycle life and a relatively high volumetric energy density.

In some embodiments, the volumetric energy density VED of the battery module may be $\geq 300$ Wh/L, $\geq 350$ Wh/L, or $\geq 360$ Wh/L. Optionally, VED$\leq 410$ Wh/L, $\leq 400$ Wh/L, or $\leq 390$ Wh/L.

In order to keep the VED of the battery module within the above ranges, optionally, the volumetric energy density $VED_1$ of the first-type battery cells may be 450 Wh/L to 650 Wh/kL, 500 Wh/L to 620 Wh/L, 520 Wh/L to 610 Wh/L, or 550 Wh/L to 600 Wh/L. The volumetric energy density of the first-type battery cells is relatively high, which is beneficial to increasing the volumetric energy density of the battery module. Optionally, the volumetric energy density $VED_2$ of the second-type battery cells may be 250 Wh/L to 450 Wh/L, 300 Wh/L to 410 Wh/L, or 340 Wh/L to 380 Wh/L. While the second-type battery cell has a relatively low expansion force change rate, its volumetric energy density can be equal to or more than 250 Wh/L, or even equal to or more than 300 Wh/L, which can improve the cyclic expansion force of the battery module using the second-type battery cells and enable the battery module to have a relatively high volumetric energy density.

In some embodiments, a nominal capacity C1 of the first-type battery cell and a nominal capacity C2 of the second-type battery cell satisfy: $0.9 \leq C1/C2 \leq 1.1$. The actual capacity of a battery cell refers to an actual quantity of electricity emitted by the battery cell under certain conditions (such as 0.2 C). The quantity of electricity provided by the battery cell under different discharge systems is also different. The actual capacity of the battery cell under an unspecified discharge system is usually represented by a nominal capacity. The nominal capacity is an approximate representation of the actual capacity. The discharge current intensity, temperature and discharge cut-off voltage of a battery cell are referred to as the discharge system of the battery cell. In the present application, as an example, the discharge system for the nominal capacity of the battery cell is: the discharge current intensity is 50 A, the temperature is 25° C., and the discharge cut-off voltage is determined according to the type of the positive electrode active material of the battery cell. When the nominal capacity C1 of the first-type battery cell and the nominal capacity C2 of the second-type battery cell are within the above range, a relatively high energy output of the battery module or battery pack can be ensured. Meanwhile, because the volumetric energy density of the first-type battery cell is higher than that of the second-type battery cell, the volume difference between the first-type battery cell and the second-type battery cell is within a certain range, which achieves a more significant effect in improving the overall expansion force of the battery module or battery pack.

The discharge cut-off voltage of a battery cell is its own characteristic. For example, when the positive electrode active material is a lithium nickel cobalt manganese oxide or a lithium nickel cobalt aluminum oxide, the discharge cut-off voltage is 2.8 V. When the positive electrode active material is lithium iron phosphate (LiFePO$_4$), the discharge cut-off voltage range may be optionally 2.5 V. When the positive electrode active material is a mixture of the two materials, the discharge cut-off voltage may be subject to the material in a larger proportion in the mixture.

In the battery module of the present application, the n first-type battery cells and the m second-type battery cells in the battery unit can be arranged face to face with each other. This enables the battery module to have a higher volumetric energy density. Buffer pads may be disposed or expansion spaces may be reserved between the n first-type battery cells and the m second-type battery cells of the battery unit. This can further prolong the cycle life of the battery module.

In the battery module of the present application, the first-type battery cells and the second-type battery cells are electrically connected, so as to output electric energy to the outside or store electric energy at the required voltage and current. The first-type battery cells and the second-type battery cells in the battery unit may be electrically connected in series or a series/parallel combination. In the present application, after the first-type battery cells and the second-type battery cells are electrically connected at least in series, the first-type battery cells and the second-type battery cells will be synchronously charged/discharged. The volumetric expansion changes of different types of battery cells are coordinated, which is conducive to predicting the overall volumetric expansion rate of the battery module in advance in the design stage, and is more convenient to modulate the improvement range of the cycle life of the battery module. In a specific example, the first-type battery cells and the second-type battery cells are electrically connected in series.

[First-Type Battery Cell]

In the first-type battery cell, the first positive electrode plate includes a first positive electrode current collector and a first positive electrode film disposed on at least one surface of the first positive electrode current collector and containing a first positive electrode active material. The first positive electrode active material has a relatively high gram capacity. Optionally, the first positive electrode active material may include one or more of lithium transition metal oxides, and oxides obtained by adding other transition metals or non-transition metals or non-metals to lithium transition metal oxides. The transition metal may be one or more of Mn, Fe, Ni, Co, Cr, Ti, Zn, V, Al, Zr, Ce and Mg. For example, the first positive electrode active material may be one or more selected from lithium nickel oxides, lithium nickel manganese oxides, lithium nickel cobalt manganese oxides, and lithium nickel cobalt aluminum oxides.

In some embodiments, the first positive electrode active material may include a lithium transition metal oxide $Li_{1+x1}Ni_aCo_bM_{1-a-b}O_{2-y1}A_{y1}$, where $-0.1 \leq x1 \leq 0.2$, $0.5 \leq a < 0.95$, $0 < b < 0.2$, $0 < a+b < 1$, $0 \leq y1 < 0.2$, M is one or more selected from Mn, Fe, Cr, Ti, Zn, V, Al, Zr and Ce, and A is one or more selected from S, F, Cl and I. Optionally, $0.5 \leq a \leq 0.85$. Optionally, $0.5 \leq a \leq 0.8$. Optionally, M includes either Mn or Al.

The first positive electrode active material has a relatively high gram capacity, and the first positive electrode plate using the first positive electrode active material can have a relatively high areal density and compaction density, so that the first-type battery cell can have a relatively high volumetric energy density (for example, the aforementioned $VED_1$), which enables the battery module to have a relatively high volumetric energy density.

In some embodiments, the first positive electrode active material includes single particles having a volumetric average particle diameter $D_v50$ of 2 μm to 8 μm. The single particles are individually dispersed primary particles, or particles formed by agglomeration of a small amount (for example, 2-5) of primary particles. Optionally, among the single particles, the particle diameter of the primary particles is not less than 1 μm. Optionally, the first positive electrode active material includes the single particles, which can improve the compressive property of the first positive electrode plate using the same. Under the cyclic expansion force in the battery module, the first positive electrode plate can still maintain relatively high electrolyte infiltration and retention, thereby ensuring effective capacity performance of the first positive electrode active material and further prolonging the cycle life of the battery module.

In some embodiments, in the first positive electrode active material, the first positive electrode active material in the single particle form has a quantity percentage of ≥40%. Optionally, the quantity percentage of the single particles in the first positive electrode active material is 40% to 100%, 50% to 100%, 50% to 90%, 60% to 100%, 60% to 80%, 70% to 100%, or 80% to 100%. The first positive electrode active material includes more single particles, which can further prolong the cycle life of the battery module.

In some embodiments, the first positive electrode active material may further include secondary particles having a degree of aggregation greater than that of the single particles. The degree of aggregation is represented by the quantity of primary particles included in the secondary particles. Optionally, the degree of aggregation of the secondary particles is ≥300, ≥500, or ≥800. When the first positive electrode active material includes secondary particles having a degree of aggregation greater than that of the single particles, it is beneficial to improving the transport capability of active ions in the first positive electrode plate, thereby reducing the polarization of the battery and further prolonging the cycle life of the battery module at low temperatures.

Optionally, the secondary particles in the first positive electrode active material may have a quantity percentage of ≥10%, ≥40%, or ≥60%. Further optionally, the secondary particles having a degree of aggregation greater than that of the single particles in the first positive electrode active material may have a quantity percentage of ≤100%, ≤90%, ≤80%, or ≤50%.

In some embodiments, the first positive electrode film may include the first positive electrode active material and an optional binder and/or conductive agent. The binder may be selected from the binders known in the art, and the conductive agent may be selected from the conductive agents known in the art. As an example, the binder may be one or more selected from polyvinylidene fluoride (PVDF), polytetrafluoroethylene (PTFE), ethylene-vinyl acetate copolymer (EVA), polyvinyl alcohol (PVA) and polyvinyl butyral (PVB). As an example, the conductive agent may be one or more selected from superconducting carbon, carbon black (such as acetylene black, Ketjen black, and Super P), carbon dots, carbon nanotubes, graphene, and carbon nanofibers.

In some embodiments, optionally, an areal density $CW_3$ of the first positive electrode film may be 15.00 mg/cm² to 20.00 mg/cm², for example, 17.50 mg/cm² to 20.00 mg/cm². Optionally, a compaction density $PD_3$ of the first positive electrode film may be 3.0 g/cm³ to 3.5 g/cm³, or 3.25 g/cm³ to 3.45 g/cm³.

In the first-type battery cell, the first positive electrode current collector may be a positive electrode current collector known in the art, such as an aluminum foil.

In the first-type battery cell, the first negative electrode plate may include a first negative electrode current collector and a first negative electrode film disposed on at least one surface of the first negative electrode current collector and containing a first negative electrode active material.

By reasonably adjusting the type of the first negative electrode active material in the first negative electrode plate and the areal density and compaction density of the first negative electrode film, the specific capacities of the first negative electrode plate and the first positive electrode plate can be matched, so that the first-type battery cell can have a relatively high volumetric energy density (such as the aforementioned $VED_1$), and the expansion force change rate $\Delta F_1$ of the first-type battery cell can meet the aforementioned requirements.

In some embodiments, the first negative electrode active material may include one or more of artificial graphite and natural graphite. Compared with other negative electrode active materials, the graphite negative electrode material has a relatively high gram capacity and relatively small cyclic expansion, which can improve the volumetric energy density and cycle performance of the first-type battery cell, thereby increasing the volumetric energy density and cycle life of the battery module.

In some embodiments, the first negative electrode film may include a first negative electrode active material, an optional binder, an optional conductive agent, and other optional auxiliary agents. The binder may be selected from the binders known in the art. As an example, the binder may be one or more selected from styrene-butadiene rubber (SBR), water-based acrylic resin, polyvinyl alcohol (PVA), etc. The conductive agent may be selected from the conductive agents known in the art. As an example, the conductive agent may be one or more selected from superconducting carbon, carbon black (such as acetylene black, Ketjen black, and Super P), carbon dots, carbon nanotubes, graphene, and carbon nanofibers. Other optional auxiliary agents are, for example, a thickener, such as carboxymethyl cellulose sodium (CMC-Na), a PTC thermistor material, etc.

In some embodiments, an areal density $CW_1$ of the first negative electrode film may be 9.70 mg/cm$^2$ to 11.68 mg/cm$^2$. Optionally, the $CW_1$ is 10.38 mg/cm$^2$ to 11.36 mg/cm$^2$. When the $CW_1$ of the first negative electrode film is in an appropriate range, the first-type battery cell can have a relatively high volumetric energy density, the diffusion resistance of active ions can also be reduced, and the cycle life of the first-type cell can be prolonged, thereby prolonging the cycle life of the battery module.

In some embodiments, a compaction density $PD_1$ of the first negative electrode film may be 1.35 g/cm$^3$ to 1.65 g/cm$^3$. Optionally, the $PD_1$ is 1.40 g/cm$^3$ to 1.60 g/cm$^3$, 1.45 g/cm$^3$ to 1.60 g/cm$^3$, or 1.45 g/cm$^3$ to 1.55 g/cm$^3$. When the $PD_1$ of the first negative electrode film is in an appropriate range, the first-type battery cell can have a relatively high volumetric energy density, the first negative electrode active material in the first negative electrode film can form close contact and good pore structures, the first negative electrode film can have relatively high diffusion performance of active ions, and the risk of lithium evolution in the negative electrode can be reduced, thereby improving the cycle life and safety performance of the first-type battery cell. Therefore, the cycle life and safety performance of the battery module are also improved.

In the first-type battery cell, the first negative electrode current collector may be a negative electrode current collector known in the art, such as a copper foil.

In the first-type battery cell, a separator is disposed between the first positive electrode plate and the first negative electrode plate to separate the two. A separator known in the art can be used according to requirements. For example, the separator may include a glass fiber film, a non-woven fabric film, a polyethylene film, a polypropylene film, a polyvinylidene fluoride film, or a multilayer composite film including two or more of them.

In the first-type battery cell, the electrolyte may include an organic solvent and a lithium salt. The types of the organic solvent and the lithium salt and the composition of the electrolyte are not subject to specific restrictions, and can be selected according to actual requirements.

As an example, the organic solvent may include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and diethyl sulfone (ESE).

As an example, the lithium salt may include one or more of LiPF$_6$ (lithium hexafluorophosphate), LiBF$_4$ (lithium tetrafluoroborate), LiClO$_4$ (lithium perchlorate), LiAsF$_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), LiPO$_2$F$_2$ (lithium difluorophosphate), LiDFOP (lithium difluorobisoxalate phosphate), and LiTFOP (lithium tetrafluorooxalate phosphate).

In some embodiments, the electrolyte may further optionally include additives. There are no specific restrictions on the types of additives, which can be selected according to actual requirements. For example, the additives may include negative electrode film-forming additives, positive electrode film-forming additives, and additives that can improve some performances of the battery, such as additives that improve overcharge performance of the battery, additives that improve high-temperature performance of the battery, and additives that improve low-temperature performance of the battery.

In the first-type battery cell, an outer package is used for packaging the battery cell and the electrolyte. The outer package may be a hard case, such as a hard plastic case, an aluminum case, or a steel case. The outer package may also be a soft package, such as a bag-type soft package. The material of the soft package may be plastic, for example, it may include one or more of polypropylene (PP), polybutylene terephthalate (PBT), polybutylene succinate (PBS), etc.

[Second-Type Battery Cell]

In the second-type battery cell, the second positive electrode plate includes a second positive electrode current collector and a second positive electrode film disposed on at least one surface of the second positive electrode current collector and containing a second positive electrode active material. Optionally, the second positive electrode active material may include one or more of an olivine structured lithium-containing phosphate and modified materials thereof. The modified materials may be of doping modification and/or coating modification of the olivine structured lithium-containing phosphate.

In some embodiments, the second positive electrode active material may include a lithium-containing phosphate LiFe$_{1-x2-y2}$Mn$_{x2}$M'$_{y2}$PO$_4$, where $0 \leq x2 \leq 1$, $0 \leq y2 \leq 0.1$, and M' is one or more selected from transition metal elements and non-transition metal elements other than Fe and Mn. Optionally, the second positive electrode active material may include one or more of LiFePO$_4$ (lithium iron phosphate, which can be abbreviated as LFP), LiMnPO$_4$, LiMn$_{1-x3}$Fe$_{x3}$PO$_4$, and LiV$_{1-x3}$Fe$_{x3}$PO$_4$, where x3 independently satisfies $0<x3<1$. The cycle stability of the second active material is good, the compaction density of the second positive electrode plate using the second active material is generally low, the areal density of the second negative electrode plate matching the second positive electrode plate is correspondingly low, and the electrode plates have relatively low rebound and good electrolyte infiltration performance, which are conducive for the second-type battery cell to obtain a relatively low cyclic expansion force and a relatively long cycle life, so that the battery module has a relatively low cyclic expansion force and a relatively long cycle life.

In some embodiments, the second positive electrode active material may include single particles having a volumetric average particle diameter $D_v50$ of 800 nm to 1.5 μm. The second positive electrode active material includes the single particles, which can improve the compressive property of the second positive electrode plate using the same. Under the cyclic expansion force in the battery module, the second positive electrode plate can still maintain relatively high electrolyte infiltration and retention, thereby ensuring effective capacity performance of the second positive electrode active material and further prolonging the cycle life of the battery module.

In some embodiments, the single particles in the second positive electrode active material have a quantity percentage of $\geq 60\%$. Optionally, the quantity percentage of the single particles in the second positive electrode active material is 60% to 100%, 70% to 100%, or 80% to 100%. When the second positive electrode active material includes a large number of single particles, it can further prolong the cycle life of the battery module.

In some embodiments, the second positive electrode film may include the second positive electrode active material and an optional binder and/or conductive agent. The binder may be selected from the binders known in the art, and the conductive agent may be selected from the conductive agents known in the art, such as the binders and conductive agents described herein.

In some embodiments, optionally, an areal density $CW_4$ of the second positive electrode film may be 18.00 mg/cm² to 28.00 mg/cm², for example, 18.00 mg/cm² to 20.00 mg/cm². Optionally, a compaction density $PD_4$ of the second positive electrode film may be 2.00 g/cm³ to 2.50 g/cm³, or 2.20 g/cm³ to 2.40 g/cm³.

In the second-type battery cell, the second positive electrode current collector may be a positive electrode current collector known in the art, such as an aluminum foil.

In the second-type battery cell, the second negative electrode plate may include a second negative electrode current collector and a second negative electrode film disposed on at least one surface of the second negative electrode current collector and containing a second negative electrode active material.

By reasonably adjusting the type of the second negative electrode active material in the second negative electrode plate and the areal density and compaction density of the second negative electrode film, the specific capacities of the second negative electrode plate and the second positive electrode plate can be matched, so that the volumetric energy density and expansion force change rate of the second-type battery cells meet the aforementioned requirements.

In some embodiments, the second negative electrode active material may include one or more of artificial graphite and natural graphite.

In some embodiments, the second negative electrode film may include a second negative electrode active material and an optional binder, conductive agent and/or other additive. The binder may be selected from the binders known in the art, the conductive agent may be selected from the conductive agents known in the art, and the other additive may be selected from the additives known in the art for negative electrode films, such as the binders, conductive agents, and other additives described herein.

In some embodiments, an areal density $CW_2$ of the second negative electrode film may be 6.50 mg/cm² to 9.70 mg/cm², or 8.11 mg/cm² to 9.40 mg/cm². When the $CW_2$ of the second negative electrode film is in an appropriate range, the second-type battery cell can obtain a relatively high volumetric energy density, the diffusion resistance of active ions can also be reduced, and the cycle life of the second-type cell can be prolonged, thereby prolonging the cycle life of the battery module.

In some embodiments, a compaction density $PD_2$ of the second negative electrode film may be 1.35 g/cm³ to 1.65 g/cm³, 1.45 g/cm³ to 1.60 g/cm³, or 1.45 g/cm³ to 1.55 g/cm³. When the $PD_2$ of the second negative electrode film is in an appropriate range, the second-type battery cell can obtain a relatively high volumetric energy density, the second negative electrode active material in the second negative electrode film can form close contact and good pore structures, the second negative electrode film can have relatively high diffusion performance of active ions, and the risk of lithium evolution in the negative electrode can be reduced, thereby improving the cycle life and safety performance of the second-type battery cell. Therefore, the cycle life and safety performance of the battery module are also improved.

In the second-type battery cell, the second negative electrode current collector may be a negative electrode current collector known in the art, such as a copper foil.

In the second-type battery cell, a separator is disposed between the second positive electrode plate and the second negative electrode plate to separate the two. A separator known in the art can be used according to actual requirements, such as the separator described herein.

In the second-type battery cell, the electrolyte may include an organic solvent and a lithium salt. The electrolyte may further optionally include additives. The types of the organic solvent, the lithium salt and the additives and the composition of the electrolyte are not subject to specific restrictions, and can be selected according to actual requirements, such as the organic solvents, lithium salts, and additives described herein.

In the second-type battery cell, an outer package is used for packaging the battery cell and the electrolyte. Optionally, the outer package of the second-type battery cell may be the outer package described herein.

FIG. 1 shows a battery module 4 as an example. Referring to FIG. 1, the battery module 4 may include a battery unit, and n first-type battery cells 5a and m second-type battery cells 5b in the battery unit are arranged in the length direction of the battery module 4 (for example, L direction). Further, the battery unit can be fixed by fasteners.

Figure 2:
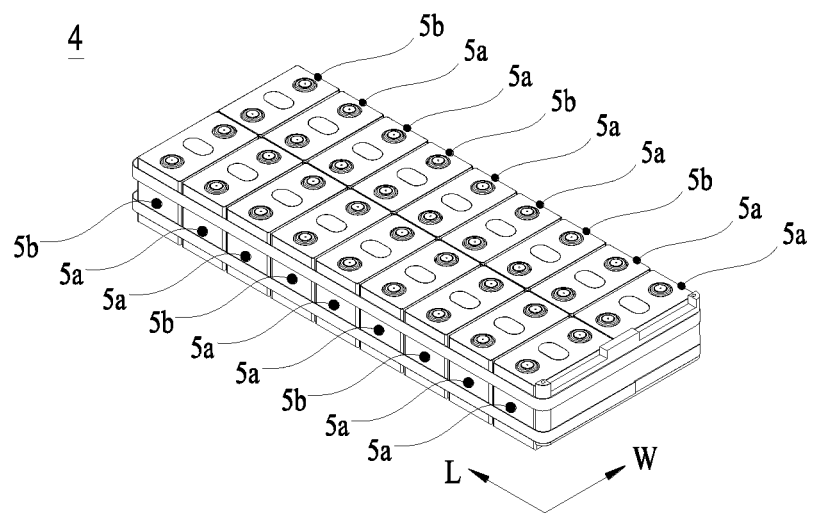
FIG. 2 is a schematic diagram of another embodiment of the battery module.

FIG. 2 shows a battery module 4 as another example. Referring to FIG. 2, the battery module 4 may include two or more battery units. The number of battery units can be adjusted according to actual requirements. Then first-type battery cells 5a and the m second-type battery cells 5b in each battery unit are arranged in the length direction of the battery module 4 (for example, L direction), and the two or more battery units are arranged in the width direction of the battery module 4 (for example, W direction). Of course, the two or more battery units can also be arranged in other ways. Further, the two or more battery units can be fixed by fasteners.

Optionally, the battery module 4 may further include a housing having a receiving space, and the battery units are arranged in the receiving space.

Figure 3:
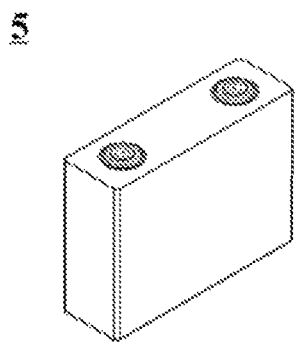
FIG. 3 is a schematic diagram of an embodiment of a first-type battery cell or a second-type battery cell.
Figure 4:
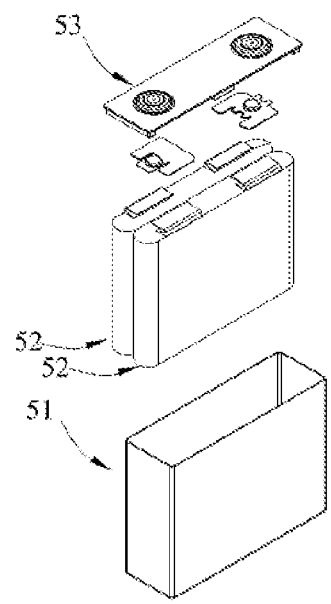
FIG. 4 is an exploded view of FIG. 3.

FIG. 3 shows a hexahedral battery cell 5 as an example, which may be the first-type battery cell 5a or the second-type battery cell 5b. FIG. 4 is an exploded view of the battery cell 5. Referring to FIG. 4, the outer package of the battery cell 5 may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity. The battery cores 52 are packaged in the receiving cavity. The electrolyte infiltrates the battery cores 52. It should be noted that the battery cell 5 shown in FIGS. 3 and 4 is a hard-shell battery, but it is not limited to this. The battery cell 5 may be a pocket type battery, that is, the shell 51 is replaced by a soft package such as a metal plastic film and the top cover assembly 53 is removed. When the battery cell 5 is used as the first-type battery cell 5a or the second-type battery cell 5b, one or more battery cores 52 may be included, which can be adjusted according to actual requirements.

Figure 5:
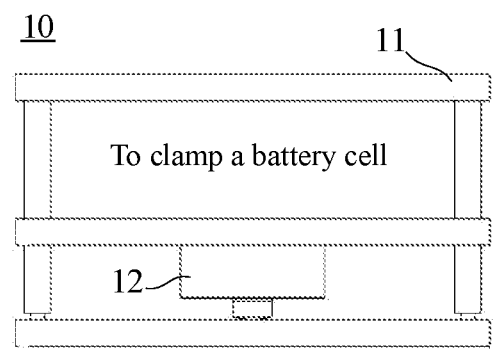
FIG. 5 is a schematic diagram of an embodiment of a battery cell expansion force detection device.
Figure 6:
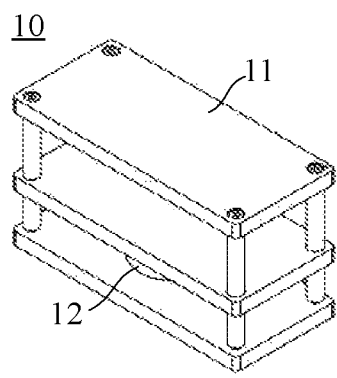
FIG. 6 is a schematic diagram of an embodiment of the battery cell expansion force detection device from another perspective.

In the present application, the expansion force change rate represents an average expansion force change $\Delta F/500$ after 500 cycles of charging and discharging of a battery cell at 25° C. and 0.33 Co rate (Co represents a nominal capacity of the battery cell) within an upper cut-off voltage and lower cut-off voltage range of the battery cell, where $\Delta F=F_{500}-F_0$, $F_{500}$ represents pressure of the battery cell measured by a sensor of a detection device after 500 cycles (that is, expansion force of the battery cell at this time), and $F_0$ represents pressure of the battery cell measured by the sensor of the detection device at the beginning (that is, expansion force of the battery cell at this time). The expansion force of the battery cell during the cycles can be tested using methods and devices known in the art, such as a detection device 10 shown in FIGS. 5 and 6. As shown in FIGS. 5 and 6, the detection device 10 includes a clamp assembly 11 and a pressure sensor 12, the clamp assembly 11 includes three steel plate clamps, a battery cell to be tested is clamped between two of the clamps, and large surfaces of the battery cell are in contact with surfaces of the steel plate clamps; the pressure sensor 12 is clamped between the other clamp and any of the aforementioned two clamps, and the pressure sensor 12 is connected to a pressure acquisition device (such as a computer). The steel plates have a thickness of 30 mm. The material of the steel plates and connectors between the steel plates may be No. 45 steel, and further, the surfaces of the steel plates may be plated with chromium. Pre-tightening members between the steel plates may have a diameter of 15 mm. The rectangular area enclosed by the pre-tightening members at four corners of the clamp should be greater than or equal to the area of the large surface of the battery cell. Pre-tightening force is applied to the battery cell to be tested through the steel plate clamps (for example, when the battery cell is a hard-shell battery, the pre-tightening force may be 3 KN; when the battery cell is a pocket type battery, the pre-tightening force may be 1 KN) and maintained during the test, and the pre-tightening force is recorded as the initial expansion force $F_0$ of the battery cell to be tested. In order to make the force on the battery cell and different positions of the pressure sensor more uniform, the battery cell and the pressure sensor can be clamped in centers of the clamps, the pre-tightening members (such as screws) at the four corners of the clamps are alternately tightened in a diagonal manner, and finally the pre-tightening members at the four corners are finely adjusted to achieve the required pre-tightening force. Then, under the condition that the ambient temperature is set to 25° C., the battery cell is charged with a constant current of 0.33 $C_0$ to the upper cut-off voltage, charged with a constant voltage until the current is less than 0.05 $C_0$, stood for 10 min, and then discharged with a constant current of 0.33 $C_0$ to the lower cut-off voltage, which is recorded as a cycle. The battery cells are subjected to 500 charge and discharge cycles, and the expansion force of the battery cell is monitored in real time. Finally, the expansion force change rate of the battery cell is calculated according to $\Delta F/500$.

The upper cut-off voltage and lower cut-off voltage of a battery cell are its own characteristics. For example, when the positive electrode active material is a lithium nickel cobalt manganese oxide, the charge and discharge voltage range is 2.8 V to 4.5 V; when Ni atoms account for 80% of transition metal atoms in the lithium nickel cobalt manganese oxide, the charge and discharge voltage range may be 2.8 V to 4.25 V; when Ni atoms account for 60% to 70% of transition metal atoms in the lithium nickel cobalt manganese oxide, the charge and discharge voltage range may be 2.8 V to 4.4 V; and when Ni atoms account for 50% of transition metal atoms in the lithium nickel cobalt manganese oxide, the charge and discharge voltage range may be 2.8 V to 4.35 V. When the positive electrode active material is a lithium nickel cobalt aluminum oxide, the charge and discharge voltage range may be 2.8 V to 4.3 V. When the positive electrode active material is a lithium iron phosphate ($LiFePO_4$), the charge and discharge voltage range may be 2.5 V to 3.65 V. When the positive electrode active material is a mixture of the two materials, the voltage range may be subject to the material in a larger proportion in the mixture.

In the present application, the volumetric energy densities of the battery cells and the battery module have well-known meanings in the art, and can be tested by methods known in the art. For example, the volumetric energy density of a battery cell is the maximum energy of the battery cell divided by the volume (length×width×shoulder height) of the battery case within the upper cut-off voltage and lower cut-off voltage range of the battery cell, wherein the shoulder height is the remaining height after the height of an electrode terminal is subtracted from the total height of the battery. The volumetric energy density of a battery module is the sum of energy of all battery cells in the battery module divided by the total volume (length×width×height) of the battery module, wherein the total volume of the battery module includes a volume of all battery cells, and other components of the battery module (including but not limited to a wiring harness, end plates and/or side plates, and a top cover plate).

In the present application, the volume of the second-type battery cell and the volume of the first-type battery cell are both calculated by the volume enclosed by the outer surfaces thereof, and the volume of electrode terminals is ignored.

In the present application, the area density of the negative electrode film has a well-known meaning in the art, refers to the mass of the negative electrode film on one side of the negative electrode current collector per unit area, and can be measured by a method known in the art. For example, a negative electrode plate coated on one side and cold-pressed (for a negative electrode plate coated on both sides, its negative electrode film on one side is first wiped off) is punched into a small wafer with an area of S1, the negative electrode plate is weighed and its weight is recorded as M1. Then the negative electrode film of the weighed negative electrode plate is wiped off, the negative electrode current collector is weighed and its weight is recorded as M0. The area density of the negative electrode film=(the weight M1 of the negative electrode plate−the weight M0 of the negative electrode current collector)/S1.

The compaction density of the negative electrode film=the areal density of the negative electrode film/the thickness of the negative electrode film. The thickness of the negative electrode film has a well-known meaning in the art, refers to the thickness of the negative electrode film on one side of the negative electrode current collector, and can be measured by a method known in the art. For example, the thickness can be measured by a 4-digit precision spiral micrometer.

In the present application, the quantity percentage of the single particles in the positive electrode active material can be tested by a method known in the art. An exemplary test method is as follows: a 1 cm×1 cm positive electrode plate is cut and pasted on a sample stage as a sample to be tested; the sample stage is put into a vacuum sample chamber and fixed, and a cross section of the electrode plate in the thickness direction is prepared by using a cross-section polisher (such as JEOL IB-09010CP); and particles in the sample to be tested are tested by using a scanning electron microscope & energy spectrometer (such as ZEISS sigma300). JY/T010-1996 can be used as a reference for the test method.

In order to ensure the accuracy of the test results, 10 different areas are randomly selected in the sample to be tested for scanning test, and at a certain magnification (for example, 5000 times), the ratio of the number of single particles to the total number of particles in each area is counted, that is, the quantity percentage of single particles in the area; and the average value of the test results of 10 test areas is taken as the quantity percentage of the single particles in the positive electrode active material.

In the present application, in the positive electrode active material, the particle diameter of primary particles in the single particles has a well-known meaning in the art, and can be measured by a method known in the art. An exemplary test method is as follows: the positive electrode film is stripped from the positive electrode current collector by ethanol soaking, repeatedly cleaned with ultrasonic, dried, and sintered at 300-400° C., the sample obtained after the sintering is placed on a sample stage as a sample to be tested; the sample stage is put into a vacuum sample chamber and fixed, and the surface morphology of particles in the sample to be tested is tested by using a scanning electron microscope & energy spectrometer (such as ZEISS sigma300).

In order to ensure the accuracy of the test results, 10 different areas are randomly selected in the sample to be tested for scanning, and at a certain magnification (for example, 5000 times), the quantity and maximum diameter of primary particles among the single particles in each area are counted.

In the present application, the volumetric average particle diameter $D_v50$ of the positive electrode active material has a well-known meaning in the art, represents a particle diameter when the cumulative volumetric distribution percentage of the positive electrode active material reaches 50%, and can be measured by instruments and methods known in the art. For example, the $D_v50$ can be conveniently measured by a laser particle size analyzer with reference to the particle size distribution laser diffraction method described in GB/T 19077-2016, such as Mastersizer 2000E type laser particle size analyzer of Malvem Instruments Co., Ltd., UK.

Manufacturing Method

Another aspect of the present application provides a method for manufacturing a battery module, which includes the following steps:

n first-type battery cells and m second-type battery cells are obtained, wherein $VED_1 > VED_2$, $\Delta F_1 > \Delta F_2$, $n \geq 1$, $m \geq 1$, $(\Delta F_1 \times n + \Delta F_2 \times m)/(n+m) \leq 0.8 \times \Delta F_1$, where $VED_1$ represents a volumetric energy density of the first-type battery cell, in Wh/L; $VED_2$ represents a volumetric energy density of the second-type battery cell, in Wh/L; $\Delta F_1$ represents an expansion force change rate of the first-type battery cell, in Newton/cycle; $\Delta F_2$ represents an expansion force change rate of the second-type battery cell, in Newton/cycle;

the n first-type battery cells and the m second-type battery cells are arranged to form a battery module.

The battery module manufactured by the method of the present application can have a relatively low cyclic expansion force, and therefore can have a relatively long cycle life.

Optionally, the electrical connection of the n first-type battery cells and the m second-type battery cells includes: the n first-type battery cells and the m second-type battery cells are electrically connected in series or in a series/parallel combination.

The technical features of the battery module in the present application are also applicable to the method for manufacturing a battery module, and the corresponding beneficial effects are produced.

Both the first-type battery cell and the second-type battery cell can be obtained commercially or manufactured by methods known in the art. As an example, a positive electrode plate, a separator and a negative electrode plate can be stacked or wound to form a cell; the cell is packaged in an outer package, an electrolyte is injected, and a battery cell is obtained after subsequent processes such as packaging.

The positive electrode plate can be manufactured according to a conventional method in the art. For example, a positive electrode active material, a conductive agent and a binder are dispersed in a solvent to form a uniform positive electrode slurry, where the solvent is, for example, N-methyl pyrrolidone (NMP); the positive electrode slurry is coated on a positive electrode current collector, and a positive electrode plate is obtained after processes of drying, cold pressing, etc.

The negative electrode plate can be manufactured according to a conventional method in the art. For example, a negative electrode active material, a conductive agent, a binder and a thickener are dispersed in a solvent to form a uniform negative electrode slurry, wherein the solvent is, for example, deionized water; the negative electrode slurry is coated on a negative electrode current collector, and a negative electrode plate is obtained after processes of drying, cold pressing, etc.

Manufacturing Device

Another aspect of the present application provides a device for manufacturing a battery module, which includes a clamping arm unit, an assembling unit and a control unit.

The clamping arm unit is used to obtain n first-type battery cells and m second-type battery cells, wherein $VED_1 > VED_2$, $\Delta F_1 > \Delta F_2$, $n \geq 1$, $m \geq 1$, $(\Delta F_1 \times n + \Delta F_2 \times m)/(n+m) \leq 0.8 \times \Delta F_1$, where $VED_1$ represents a volumetric energy density of the first-type battery cell, in Wh/L; $VED_2$ represents a volumetric energy density of the second-type battery cell, in Wh/L; $\Delta F_1$ represents an expansion force change rate of the first-type battery cell, in Newton/cycle; and $\Delta F_2$ represents an expansion force change rate of the second-type battery cell, in Newton/cycle.

The assembling unit is used to arrange the n first-type battery cells and the m second-type battery cells.

The control unit is used to control the clamping arm unit and the assembling unit to work.

The clamping arm unit, the assembling unit and the control unit can all be apparatuses or devices known in the art according to actual requirements.

The battery module manufactured by the device of the present application can have a relatively low cyclic expansion force, and therefore can have a relatively long cycle life.

Battery Pack

Another aspect of the present application further provides a battery pack, which includes any one or several battery modules according to the present application. The number of battery modules included in the battery pack can be adjusted according to the application and capacity of the battery pack. Optionally, the battery pack may further include auxiliary components such as a battery management system module (BMS) and cooling/heating components.

In some embodiments, the battery pack includes two or more battery modules, and each battery module is the battery module described in the present application. The cyclic expansion force in the battery pack is greatly relieved, so its cycle life can be significantly prolonged. In addition, the battery pack can also have a relatively high volumetric energy density.

Figure 7:
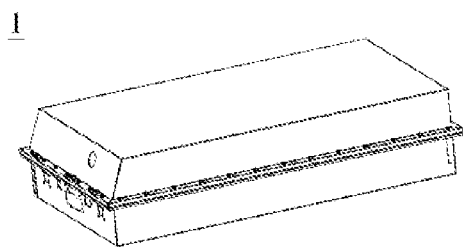
FIG. 7 is a schematic diagram of an embodiment of a battery pack.
Figure 8:
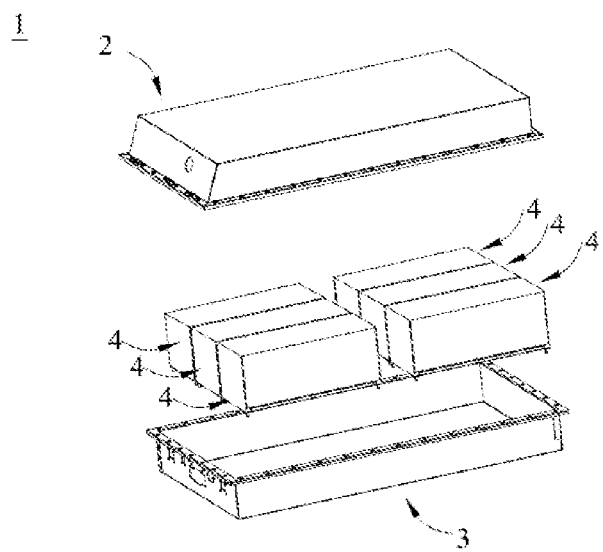
FIG. 8 is an exploded view of FIG. 7.

FIGS. 7 and 8 show a battery pack 1 as an example. Referring to FIGS. 7 and 8, the battery pack 1 may include a battery box and a plurality of battery modules 4 disposed in the battery box. The battery box includes an upper box body 2 and a lower box body 3. The upper box body 2 can cover the lower box body 3, to form a closed space for accommodating the battery modules 4. The plurality of battery modules 4 may be arranged in the battery box in any manner.

Apparatus

Another aspect of the present application further provides an apparatus, which includes the battery module or battery pack described in the present application. The battery module or battery pack can be used as a power source of the apparatus to provide power to the apparatus, and can also be used as an energy storage unit of the apparatus. The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc. The apparatus may select an electrochemical device, such as a primary battery, a secondary battery, a battery module or a battery pack according to its usage requirements.

Figure 9:
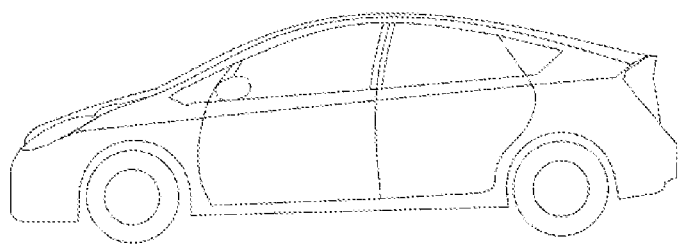
FIG. 9 is a schematic diagram of an embodiment of an apparatus using the battery module or battery pack as a power source.

FIG. 9 shows an apparatus as an example. The apparatus is a pure electric vehicle, a hybrid electric vehicle, or a plug-in hybrid electric vehicle. The apparatus may use the battery pack or battery module.

EXAMPLES

The following examples more specifically describe the content disclosed in the present application, and these examples are only used for explanatory description, because various modifications and changes within the scope of the present disclosure will be obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of a First-Type Battery Cell:
Preparation of a Positive Electrode Plate A first positive electrode active material $LiNi_{0.5}Co_{0.2}Mn_{0.3}O_2$, a conductive agent Super-P, and a binder PVDF were dispersed at a weight ratio of 95:2:3 in a solvent NMP, and mixed thoroughly to obtain a positive electrode slurry. The positive electrode slurry was coated on two opposite surfaces of an aluminum foil as a positive electrode current collector, and a first positive electrode plate was obtained after drying and cold pressing. The positive electrode film had an areal density of 18.83 mg/cm² and a compaction density of 3.25 g/cm³; and the single particles in the first positive electrode active material had a quantity percentage of 100%.

Preparation of a Negative Electrode Plate

Natural graphite as a first negative electrode active material, a conductive agent Super-P, a binder SBR and a thickener CMC-Na were dispersed at a weight ratio of 93:3:2:2 in deionized water as a solvent, and mixed uniformly to obtain a negative electrode slurry. Afterwards, the negative electrode slurry was coated on two opposite surfaces of a copper foil as a negative electrode current collector, and a negative electrode plate was obtained after drying and cold pressing. The negative electrode film had an areal density of 11.62 mg/cm² and a compaction density of 1.45 g/cm³.

Preparation of an Electrolyte

Ethylene carbonate (EC), propylene carbonate (PC) and dimethyl carbonate (DMC) were mixed uniformly at a weight ratio of 1:1:1 to obtain an organic solvent; then a lithium salt $LiPF_6$ was dissolved in the organic solvent and mixed uniformly to obtain an electrolyte, wherein the $LiPF_6$ had a concentration of 1 mol/L.

Preparation of a First-Type Battery Cell

A first positive electrode plate, a polyethylene porous separator, and a first negative electrode plate were laminated in order, and then wound to obtain a battery core; the battery core was put in an outer package, an electrolyte was injected, and the battery core was packaged to obtain a first-type battery cell. The first-type battery cell had a group margin of 99.0%. The first-type battery cell had a volumetric energy density of 552 Wh/L.

Preparation of a Second-Type Battery Cell:

The preparation method of the second-type battery cell was similar to that of the first-type battery cell, and the differences lied in that the preparation parameters of the positive electrode plate and the negative electrode plate were adjusted, where the differences were shown in Table 1.

Preparation of a Battery Module:

6 first-type battery cells and 14 second-type battery cells were taken; the 6 first-type battery cells and the 14 second-type battery cells were arranged in the length direction of the battery module and connected in series, and the sequence of the battery cells arranged in the battery module was BBBA-BBBAABBBAABBBABB, where the first-type battery cells were denoted by A, and the second-type battery cells were denoted by B; and the series battery cells were put into a housing to form a battery module.

Figure 10:
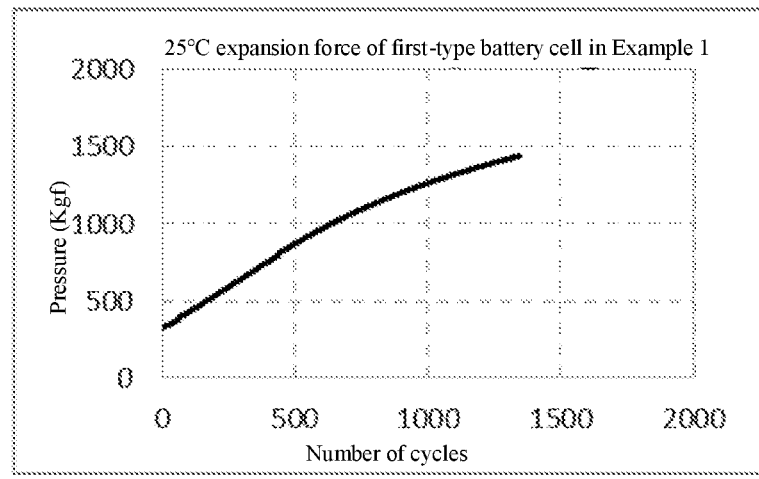
FIG. 10 is a curve diagram of expansion force of the first-type battery cell that changes with the number of cycles in an embodiment.
Figure 11:
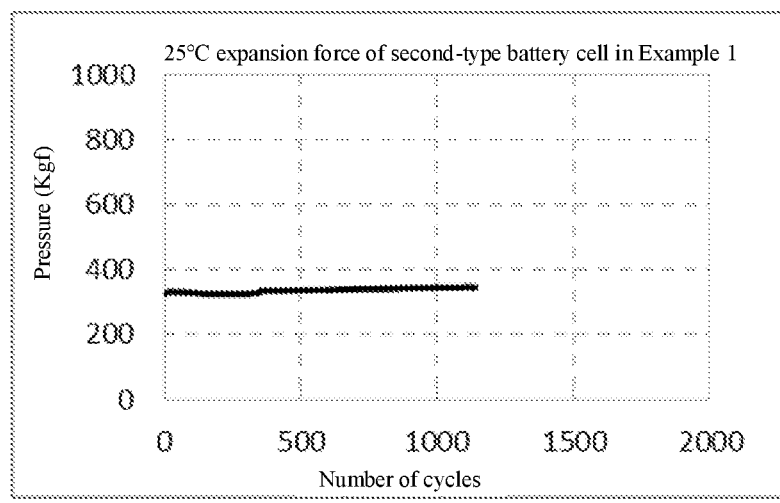
FIG. 11 is a curve diagram of expansion force of the second-type battery cell that changes with the number of cycles in an embodiment.

FIG. 10 shows a curve diagram of expansion force of the first-type battery cells that changed with the number of cycles in Example 1. FIG. 11 shows a curve diagram of expansion force of the second-type battery cells that changed with the number of cycles in Example 1. It can be seen that the first-type battery cells with a relatively high volumetric energy density had a relatively high expansion force change rate. The second-type battery cells with a relatively low volumetric energy density had a relatively small expansion force change rate, and the expansion force changed relatively smoothly during the cycle of charging and discharging.

Examples 2-13 and Comparative Examples 1-4

The preparation methods of the first-type battery cells, the second-type battery cells and the battery modules were similar to those in Example 1, and the differences lied in that the preparation parameters of the positive electrode plates and the negative electrode plates in the first-type battery cells and the second-type battery cells were adjusted, and the preparation parameters of the battery modules were also adjusted, where the differences were shown in Tables 1 to 4.

Tests
(1) The volumetric energy densities of the battery modules were tested according to the method described above.
(2) Test on group margin of a battery cell A total volume $V_1$ of a bare battery core after all the positive electrode plates, negative electrode plates and the separators are wound was tested, and an internal volume $V_t$ of an empty shell for packaging the battery was also tested. The group margin of the battery cell=$V_1/V_t \times 100\%$.

(3) Test on cycle life of the battery module

The battery module was put in a high and low temperature box and kept at a constant temperature of 25° C. 0.33 C (C represents a nominal capacity of the first-type battery cell) was taken as a charge-discharge rate. The battery module was first charged at 0.33 C to a rated upper cut-off voltage, stood for 5 minutes, and then discharged at 0.33 C to a rated lower cut-off voltage. The battery module was stood for 5 minutes. The completion of a charge and discharge process was recorded as a cycle, and the charge and discharge were repeated until the discharge capacity of the battery module was 80% of the initial capacity before the test ended. The rated upper cut-off voltage of the battery module was the sum of the rated upper cut-off voltages of the battery cells, and the rated lower cut-off voltage of the battery module was the sum of the rated lower cut-off voltages of the battery cells.

(4) Test on Lithium Evolution

In an environment of 25° C., the battery module was cyclically charged and discharged 10 times at 1 C (C represents a nominal capacity of the first-type battery cell) constant current charging rate and 1 C discharge rate. The test on lithium evolution ended.

The test results are shown in Table 3 below.

TABLE 1

Preparation parameters of first-type battery cells

| | First positive electrode plate | | | | | First negative electrode plate | | | | | |
| --- | --- | --- | --- | --- | --- | --- | --- | --- | --- | --- | --- |
| Model | First positive electrode active material | Particle morphology | Quantity percentage of single particles (%) | $PD_3$ (g/cm³) | $CW_3$ (mg/cm²) | First negative electrode active material | $PD_1$ (g/cm³) | $CW_1$ (mg/cm²) | Group margin | Energy density (Wh/L) | $\Delta F_1$ (Newton/ cycle) |
| I-3 | $LiNi_{0.5}Co_{0.2}Mn_{0.3}O_2$ | I | 100 | 3.25 | 18.83 | Natural graphite | 1.45 | 11.62 | 99.0% | 552 | 10.8 |
| I-7 | $LiNi_{0.8}Co_{0.1}Mn_{0.1}O_2$ | II | 100 | 3.30 | 17.85 | Natural graphite | 1.35 | 10.71 | 95.2% | 534 | 6.0 |
| I-9 | $LiNi_{0.8}Co_{0.1}Mn_{0.1}O_2$ | II | 100 | 3.30 | 17.85 | Natural graphite | 1.40 | 11.04 | 97.1% | 560 | 7.3 |
| I-10 | $LiNi_{0.8}Co_{0.1}Mn_{0.1}O_2$ | II | 100 | 3.30 | 17.85 | Natural graphite | 1.40 | 11.10 | 98.3% | 573 | 8.8 |
| I-11 | $LiNi_{0.8}Co_{0.1}Mn_{0.1}O_2$ | II | 100 | 3.40 | 17.85 | Natural graphite | 1.50 | 11.23 | 99.0% | 585 | 12.4 |
| I-14 | $LiNi_{0.8}Co_{0.1}Mn_{0.1}O_2$ | II | 100 | 3.40 | 17.85 | Natural graphite | 1.65 | 11.62 | 99.0% | 610 | 14.0 |
| I-15 | $LiNi_{0.8}Co_{0.1}Mn_{0.1}O_2$ | I + II | 20 | 3.41 | 17.85 | Natural graphite | 1.65 | 11.62 | 99.0% | 613 | 14.2 |
| I-16 | $LiNi_{0.8}Co_{0.1}Mn_{0.1}O_2$ | I + II | 40 | 3.43 | 17.85 | Natural graphite | 1.65 | 11.62 | 99.0% | 615 | 14.3 |
| I-17 | $LiNi_{0.8}Co_{0.1}Mn_{0.1}O_2$ | I + II | 60 | 3.45 | 17.85 | Natural graphite | 1.65 | 11.62 | 99.0% | 618 | 14.4 |

In Table 1, the particle morphology I represents single particles, which have a volumetric average particle diameter $D_v50$ of 5 μm; the particle morphology II represents secondary particles having a degree of aggregation greater than that of the single particles; and the particle morphology I + II represents mixed particles of the single particles and the secondary particles II having the degree of aggregation greater than that of the single particles. $PD_3$ represents a compaction density of the first positive electrode film; and $CW_3$ represents an areal density of the first positive electrode film.

TABLE 2

Preparation parameters of second-type battery cells

| | Second positive electrode plate | | | | | Second negative electrode plate | | | | | |
| --- | --- | --- | --- | --- | --- | --- | --- | --- | --- | --- | --- |
| Type | Second positive electrode active material | Particle morphology | Quantity percentage of single particles (%) | $PD_4$ (g/cm³) | $CW_4$ (mg/cm²) | Second negative electrode active material | $PD_2$ (g/cm³) | $CW_2$ (mg/cm²) | Group margin | Energy density (Wh/L) | $\Delta F_2$ (Newton/ cycle) |
| II-4 | LFP | III | 100 | 2.35 | 19.15 | Artificial graphite | 1.55 | 9.22 | 94.8% | 361 | 1.6 |
| II-5 | LFP | III | 100 | 2.35 | 19.35 | Natural graphite | 1.55 | 9.28 | 95.0% | 365 | 2.3 |
| II-6 | LFP | III | 100 | 2.35 | 19.54 | Natural graphite | 1.55 | 9.41 | 97.0% | 369 | 3.4 |
| II-7 | LFP | III | 100 | 2.35 | 19.48 | Artificial graphite | 1.35 | 9.15 | 95.1% | 341 | 1.5 |
| II-8 | LFP | III | 100 | 2.35 | 19.48 | Artificial graphite | 1.50 | 9.22 | 95.1% | 358 | 1.6 |
| II-9 | LFP | III | 100 | 2.35 | 19.48 | Artificial graphite | 1.54 | 9.22 | 95.1% | 359 | 1.8 |
| II-10 | LFP | III | 100 | 2.35 | 19.48 | Natural graphite | 1.58 | 9.28 | 95.1% | 367 | 2.5 |

In Table 2, the particle morphology III represents single particles, which have a volumetric average particle diameter $D_v50$ of 1 μm. $PD_4$ represents a compaction density of the second positive electrode film and $CW_4$ represents an areal density of the second positive electrode film.

TABLE 3

Assembling parameters and performance parameters of battery modules

| | First-type battery cell | | | | | Second-type battery cell | | |
|---|---|---|---|---|---|---|---|---|
| Serial number | Type | $VED_1$ (Wh/L) | Volume percent | $\Delta F_1$ (Newton/cycle) | n (piece) | Type | $VED_2$ (Wh/L) | Volume percent |
| Example 1 | I-3 | 552 | 30% | 10.8 | 6 | II-4 | 361 | 70% |
| Example 2 | I-3 | 552 | 35% | 10.8 | 7 | II-4 | 361 | 65% |
| Example 3 | I-3 | 552 | 50% | 10.8 | 10 | II-4 | 361 | 50% |
| Example 4 | I-3 | 552 | 60% | 10.8 | 12 | II-4 | 361 | 40% |
| Example 5 | I-9 | 560 | 70% | 7.3 | 14 | II-5 | 365 | 30% |
| Example 6 | I-9 | 560 | 65% | 7.3 | 13 | II-5 | 365 | 35% |
| Example 7 | I-11 | 585 | 55% | 12.4 | 11 | II-5 | 365 | 45% |
| Example 8 | I-11 | 585 | 50% | 12.4 | 10 | II-6 | 369 | 50% |
| Example 9 | I-14 | 610 | 45% | 14.0 | 10 | II-8 | 358 | 55% |
| Example 10 | I-10 | 573 | 40% | 8.8 | 8 | II-10 | 367 | 60% |
| Example 11 | I-15 | 613 | 45% | 14.2 | 10 | II-8 | 358 | 55% |
| Example 12 | I-16 | 615 | 45% | 14.3 | 10 | II-8 | 358 | 55% |
| Example 13 | I-17 | 618 | 45% | 14.4 | 10 | II-8 | 358 | 55% |
| Comparative Example 1 | I-7 | 534 | 100% | 6.0 | 20 | / | / | / |
| Comparative Example 2 | / | / | / | / | / | II-9 | 359 | 100% |
| Comparative Example 3 | I-14 | 610 | 90% | 14.0 | 17 | II-7 | 341 | 10% |
| Comparative Example 4 | I-10 | 573 | 89% | 8.8 | 18 | II-10 | 367 | 11% |

| | Second-type battery cell | | | | | | | Whether lithium is evolved |
|---|---|---|---|---|---|---|---|---|
| Serial number | $\Delta F_2$ (Newton/cycle) | m (pieces) | Z | Y | X | VED (Wh/L) | Number of cycles | |
| Example 1 | 1.6 | 14 | 0.76 | 60.4% | 0.40 | 335 | 2500 | No |
| Example 2 | 1.6 | 13 | 0.78 | 54.8% | 0.45 | 342 | 2400 | No |
| Example 3 | 1.6 | 10 | 0.83 | 39.5% | 0.57 | 365 | 2350 | No |
| Example 4 | 1.6 | 8 | 0.86 | 30.4% | 0.66 | 380 | 2250 | No |
| Example 5 | 2.3 | 6 | 0.90 | 21.8% | 0.79 | 401 | 2000 | No |
| Example 6 | 2.3 | 7 | 0.88 | 26.0% | 0.76 | 393 | 2050 | No |
| Example 7 | 2.3 | 9 | 0.83 | 33.8% | 0.63 | 389 | 2150 | No |
| Example 8 | 3.4 | 10 | 0.82 | 38.7% | 0.64 | 382 | 2100 | No |
| Example 9 | 1.6 | 10 | 0.79 | 37.0% | 0.56 | 380 | 2300 | No |
| Example 10 | 2.5 | 12 | 0.78 | 49.0% | 0.57 | 360 | 2320 | No |
| Example 11 | 1.6 | 10 | 0.79 | 36.9% | 0.56 | 382 | 2350 | No |
| Example 12 | 1.6 | 10 | 0.79 | 36.8% | 0.56 | 385 | 2390 | No |
| Example 13 | 1.6 | 10 | 0.79 | 36.7% | 0.56 | 389 | 2400 | No |
| Comparative Example 1 | / | / | 1.00 | / | 1.00 | 427 | 1400 | Yes |
| Comparative Example 2 | 1.8 | 20 | / | 100% | / | 287 | 3000 | No |
| Comparative Example 3 | 1.5 | 3 | 0.93 | 9.0% | 0.87 | 466 | 1600 | Yes |
| Comparative Example 4 | 2.5 | 2 | 0.96 | 6.6% | 0.93 | 440 | 1560 | Yes |

In Table 3:
$Z = (VED_1 \times n + VED_2 \times m)/(n + m)/VED_1$;
$Y = VED_2 \times m/(VED_1 \times n + VED_2 \times m) \times 100\%$;
$X = (\Delta F_1 \times n + \Delta F_2 \times m)/(n + m)/\Delta F_1$

TABLE 4

Arrangement of first-type battery cells and second-type battery cells in battery modules

| Serial number | Arrangement (first-type battery cell-A; second-type battery cell-B) |
|---|---|
| Example 1 | BBBABBBAABBBAABBBABB |
| Example 2 | BBAABBBAABBBAABBBABB |
| Example 3 | BAABBAABBAABBAABBAAB |
| Example 4 | BAABBAABAAABBAAABAAB |
| Example 5 | BAAABAAABAAABAAABAAB |
| Example 6 | BAAABAAABBAABAAABAAB |
| Example 7 | BAABBAABAAABBAABBAAB |
| Example 8 | BAABBAABBAABBAABBAAB |
| Example 9 | BAABBAABBAABBAABBAAB |
| Example 10 | BBAABBABBAABBAABBABB |
| Example 11 | BAABBAABBAABBAABBAAB |
| Example 12 | BAABBAABBAABBAABBAAB |

TABLE 4-continued

Arrangement of first-type battery cells and
second-type battery cells in battery modules

| Serial number | Arrangement (first-type battery cell-A; second-type battery cell-B) |
|---|---|
| Example 13 | BAABBAABBAABBAABBAAB |
| Comparative Example 1 | AAAAAAAAAAAAAAAAAAAA |
| Comparative Example 2 | BBBBBBBBBBBBBBBBBBBB |
| Comparative Example 3 | AAAABAAAABAAAABAAAAA |
| Comparative Example 4 | AAAAAABAAAAAABAAAAAA |

It can be seen from the above test results that, in the examples of the present application, the first-type battery cells with higher volumetric energy density and higher expansion force change rate were combined with the second-type battery cells with lower volumetric energy density and lower expansion force change rate, and the expansion force change rate of the first-type battery cells and the expansion force change rate of the second-type battery cells were controlled to satisfy a specific relationship, so that the battery modules had both relatively high volumetric energy density and relatively long cycle life. In addition, the risk of lithium evolution from the battery cells in the battery module was significantly reduced, and its safety performance was also improved.

The battery modules in Comparative Examples 1-4 did not satisfy the above conditions, and therefore cannot have both relatively high volumetric energy density and relatively long cycle life. In addition, when the battery modules included battery cells with a high volumetric energy density, lithium evolution was likely to occur.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A battery module, comprising:
a battery unit, wherein the battery unit comprises n first-type battery cells and m second-type battery cells, n≥6, m≥6, and the n first-type battery cells and the m second-type battery cells are arranged and satisfy:

$VED_1 > VED_2$, $\Delta F_1 > \Delta F_2$, $(\Delta F_1 \times n + \Delta F_2 \times m)/(n+m) \leq 0.8 \times \Delta F_1$, where $VED_1$ represents a volumetric energy density of the first-type battery cell, in Wh/L,
$VED_2$ represents a volumetric energy density of the second-type battery cell, in Wh/L,
$\Delta F_1$ represents an expansion force change rate of the first-type battery cell, in Newton/cycle, and
$\Delta F_2$ represents an expansion force change rate of the second-type battery cell, in Newton/cycle,
wherein the expansion force change rate is an average expansion force change $\Delta F/500$ after 500 cycles of charging and discharging of a battery cell at 25° C. and 0.33 $C_0$ rate ($C_0$ represents a nominal capacity of the battery cell) within an upper cut-off voltage and lower cut-off voltage range of the battery cell, and the $\Delta F$ is a change value of pressure of the battery cell detected by a sensor of a detection device at the 500th cycle and at the beginning; and wherein the n first-type battery cells and the m second-type battery cells are electrically connected, and the electrical connection is a series connection or a series/parallel combination, wherein the number n of the first-type battery cells and the number m of the second-type battery cells can satisfy: 12≤n+m≤30; and wherein the second-type battery cells are arranged at intervals of an appropriate number of the first-type battery cells.

2. The battery module according to claim 1, wherein the battery module further satisfies at least one of the following two conditions:

$(VED_1 \times n + VED_2 \times m)/(n+m) \geq 0.7 \times VED_1$;  condition 1

$VED_2 \times m/(VED_1 \times n + VED_2 \times m) \times 100\% \leq 65\%$.  condition 2

3. The battery module according to claim 1, wherein the battery module has a volumetric energy density VED≥300 Wh/L.

4. The battery module according to claim 1, wherein $(\Delta F_1 \times n + \Delta F_2 \times m)/(n+m) \leq 0.75 \times \Delta F_1$.

5. The battery module according to claim 1, wherein the $\Delta F_1$ is 6 Newton/cycle to 15 Newton/cycle; and/or
the $\Delta F_2$ is 0.9 Newton/cycle to 4.5 Newton/cycle.

6. The battery module according to claim 1, wherein a nominal capacity C1 of the first-type battery cell and a nominal capacity C2 of the second-type battery cell satisfy: 0.9≤C1/C2≤1.1.

7. The battery module according to claim 1, wherein the number of first-type battery cells continuously arranged in the battery unit is not more than n/2.

8. The battery module according to claim 1, wherein the first-type battery cell comprises a first negative electrode plate, the first negative electrode plate comprises a first negative electrode film containing a first negative electrode active material, the first negative electrode active material comprises one or more of artificial graphite and natural graphite, and the first negative electrode film satisfies at least one of the following conditions:
condition 1: the first negative electrode film has an areal density $CW_1$ of 9.70 mg/cm² to 11.68 mg/cm²;
condition 2: the first negative electrode film has a compaction density $PD_1$ of 1.35 g/cm³ to 1.65 g/cm³.

9. The battery module according to claim 1, wherein the first-type battery cell comprises a first positive electrode plate, the first positive electrode plate comprises a first positive electrode active material, and the first positive electrode active material comprises a lithium transition metal oxide represented by formula (I),

$Li_{1+x1}Ni_aCo_bM_{1-a-b}O_{2-y1}A_{y1}$  formula (I)

where −0.1≤x1≤0.2, 0.5≤a<0.95, 0<b<0.2, 0<a+b<1, 0≤y1<0.2, M is one or more selected from Mn, Fe, Cr, Ti, Zn, V, Al, Zr and Ce, and A is one or more selected from S, F, Cl and I.

10. The battery module according to claim 1, wherein the second-type battery cell comprises a second negative electrode plate, the second negative electrode plate comprises a second negative electrode film containing a second negative electrode active material, the second negative electrode active material comprises one or more of artificial graphite and natural graphite, and the second negative electrode film satisfies at least one of the following conditions:

condition 1: the second negative electrode film has an areal density $CW_2$ of 6.50 mg/cm$^2$ to 9.70 mg/cm$^2$;

condition 2: the second negative electrode film has a compaction density $PD_2$ of 1.35 g/cm$^3$ to 1.65 g/cm$^3$.

11. The battery module according to claim 1, wherein the second-type battery cell comprises a second positive electrode plate, the second positive electrode plate comprises a second positive electrode active material, and the second positive electrode active material comprises a lithium-containing phosphate represented by formula (II), $$LiFe_{1-x2-y2}Mn_{x2}M'_{y2}PO_4 \qquad \text{formula (II)}$$

where 0≤x2≤1, 0≤y2≤0.1, and M' is one or more selected from transition metal elements and non-transition metal elements other than Fe and Mn.

12. A battery pack, comprising the battery module according to claim 1.

13. The battery pack according to claim 12, wherein the battery pack comprises two or more battery modules.

14. An apparatus, comprising the battery module according to claim 1, wherein the battery module is used to provide power for the apparatus or used as an energy storage unit of the apparatus.

15. A method for manufacturing a battery module, comprising the following steps:

obtaining n first-type battery cells and m second-type battery cells, wherein $$VED_1 > VED_2, \Delta F_1 > \Delta F_2, n \geq 6, m \geq 6,$$

$$(\Delta F_1 \times n + \Delta F_2 \times m)/(n+m) \leq 0.8 \times \Delta F_1,$$

where $VED_1$ represents a volumetric energy density of the first-type battery cell, in Wh/L, $VED_2$ represents a volumetric energy density of the second-type battery cell, in Wh/L, $\Delta F_1$ represents an expansion force change rate of the first-type battery cell, in Newton/cycle, and $\Delta F_2$ represents an expansion force change rate of the second-type battery cell, in Newton/cycle; and arranging the n first-type battery cells and the m second-type battery cells to form the battery module, wherein the expansion force change rate is an average expansion force change ΔF/500 after 500 cycles of charging and discharging of a battery cell at 25° C. and 0.33 $C_0$ rate ($C_0$ represents a nominal capacity of the battery cell) within an upper cut-off voltage and lower cut-off voltage range of the battery cell, and the ΔF is a change value of pressure of the battery cell detected by a sensor of a detection device at the 500th cycle and at the beginning; and wherein the n first-type battery cells and the m second-type battery cells are electrically connected, and the electrical connection is a series connection or a series/parallel combination, wherein the number n of the first-type battery cells and the number m of the second-type battery cells can satisfy: 12≤n+m≤30; and wherein the second-type battery cells are arranged at intervals of an appropriate number of the first-type battery cells.

16. A device for manufacturing a battery module, comprising:

a clamping arm unit, configured to obtain n first-type battery cells and m second-type battery cells, wherein $$VED_1 > VED_2, \Delta F_1 > \Delta F_2, n \geq 6, m \geq 6,$$

$$(\Delta F_1 \times n + \Delta F_2 \times m)/(n+m) \leq 0.8 \times \Delta F_1,$$

where $VED_1$ represents a volumetric energy density of the first-type battery cell, in Wh/L, $VED_2$ represents a volumetric energy density of the second-type battery cell, in Wh/L, $\Delta F_1$ represents an expansion force change rate of the first-type battery cell, in Newton/cycle, and $\Delta F_2$ represents an expansion force change rate of the second-type battery cell, in Newton/cycle;

an assembling unit, configured to arrange the n first-type battery cells and the m second-type battery cells; and a control unit, configured to control the clamping arm unit and the assembling unit, wherein the expansion force change rate is an average expansion force change ΔF/500 after 500 cycles of charging and discharging of a battery cell at 25° C. and 0.33 $C_0$ rate ($C_0$ represents a nominal capacity of the battery cell) within an upper cut-off voltage and lower cut-off voltage range of the battery cell, and the ΔF is a change value of pressure of the battery cell detected by a sensor of a detection device at the 500th cycle and at the beginning; and wherein the n first-type battery cells and the m second-type battery cells are electrically connected, and the electrical connection is a series connection or a series/parallel combination, wherein the number n of the first-type battery cells and the number m of the second-type battery cells can satisfy: 12≤n+m≤30; and wherein the second-type battery cells are arranged at intervals of an appropriate number of the first-type battery cells.

* * * * *